United States Patent
Knapp

(10) Patent No.: US 8,747,584 B2
(45) Date of Patent: Jun. 10, 2014

(54) FLASHLESS WELDING METHOD AND APPARATUS

(75) Inventor: Mark Knapp, Ravenna, OH (US)

(73) Assignee: SpringSeal, Inc., Streetsboro, OH (US)

( * ) Notice: Subject to any disclaimer, the term of this patent is extended or adjusted under 35 U.S.C. 154(b) by 525 days.

(21) Appl. No.: 12/983,464

(22) Filed: Jan. 3, 2011

(65) Prior Publication Data

US 2011/0094653 A1 Apr. 28, 2011

Related U.S. Application Data

(60) Continuation-in-part of application No. 12/364,805, filed on Feb. 3, 2009, now Pat. No. 7,861,757, which is a division of application No. 11/347,142, filed on Feb. 3, 2006, now Pat. No. 7,503,992.

(51) Int. Cl.
*B32B 37/00* (2006.01)
*B29C 65/00* (2006.01)
*B29C 65/20* (2006.01)

(52) U.S. Cl.
CPC .............. *B29C 66/91* (2013.01); *B29C 66/1142* (2013.01); *B29C 65/20* (2013.01)
USPC ........ 156/64; 156/158; 156/273.3; 156/304.2; 156/304.6; 156/359; 156/380.9; 156/499

(58) Field of Classification Search
USPC .................. 156/64, 158, 273.3, 304.1, 304.2, 156/304.6, 359, 380.9, 499, 502, 580
See application file for complete search history.

(56) References Cited

U.S. PATENT DOCUMENTS

| | | | |
|---|---|---|---|
| 4,239,574 A | | 12/1980 | Aust et al. |
| 4,929,293 A | * | 5/1990 | Osgar ........................... 156/158 |
| 5,439,546 A | | 8/1995 | Brickenstein |
| 5,688,536 A | * | 11/1997 | Van Erden et al. ......... 425/174.4 |
| 5,902,657 A | | 5/1999 | Hanson et al. |
| 6,056,033 A | | 5/2000 | Schwaiger |
| 6,068,038 A | | 5/2000 | Kawaura |
| 6,228,204 B1 | | 5/2001 | Reinhardt et al. |
| 7,122,088 B2 | | 10/2006 | Field et al. |

(Continued)

OTHER PUBLICATIONS

Mitsubishi Electric Automation, "Programmable Logic Controllers FX Family", manual/specification sheets, pp. 197-254. The pages in this Literature were published more than one-year prior to the filed, namely Jan. 2, 2010.

(Continued)

*Primary Examiner* — James Sells
(74) *Attorney, Agent, or Firm* — Tarolli, Sundheim, Covell & Tummino LLP

(57) ABSTRACT

A method and apparatus for welding ends of two separate articles or a single article to form a single welded article. The apparatus comprises first and second molds for supporting and clamping first and second ends of at least one article and an infrared heating element for thermally energizing over a prescribed period of time the first and second ends of the at least one article to a welding condition. The apparatus further comprises a regulator for altering the power supplied for energizing the infrared heater over at least a portion of the prescribed period of time to achieve increased electromagnetic radiation penetration into the body of the at least one article beyond the first and second ends. The apparatus also comprises an actuator for advancing the first and second ends into a contacting position to form a single welded article.

15 Claims, 12 Drawing Sheets

(56) References Cited

U.S. PATENT DOCUMENTS

| | | | |
|---|---|---|---|
| 7,343,950 | B2 | 3/2008 | Field et al. |
| 7,503,992 | B2 | 3/2009 | Knapp |
| 2006/0151108 | A1* | 7/2006 | St. Denis et al. .......... 156/309.9 |
| 2007/0181654 | A1 | 8/2007 | Knapp |
| 2009/0133841 | A1 | 5/2009 | Knapp |

OTHER PUBLICATIONS

Three (3) page specification sheets for the "Athena T-1000" rotary dimmer, Ready Wholesale Electrical Supply, print out from web site http://www.readywholesaleelectric.com/luattsmcoinr1.html. The pages in this Literature were published more than one-year prior to the filed, namely Jan. 2, 2010.

Mitsubishi Electric Factory Automation, "MR-J3 Servo Amplifiers and Motors-Advanced Servo Technology for Ultimate Position Control", manual/specification sheets, pp. 1-47. The pages in this Literature were published more than one-year prior to the filing date, namely Jan. 2, 2010.

Two (2) page specification sheets for the Heraeus shortwave twin tube infrared heater, Noblelight, print out from website: hftp://www.noblelight.net/infrared_heaters/standard_short_wave_twin_tube_infrared.heaters.shtml. The pages in this Literature were published more than one-year prior to the filed, namely Jan. 2, 2010.

* cited by examiner

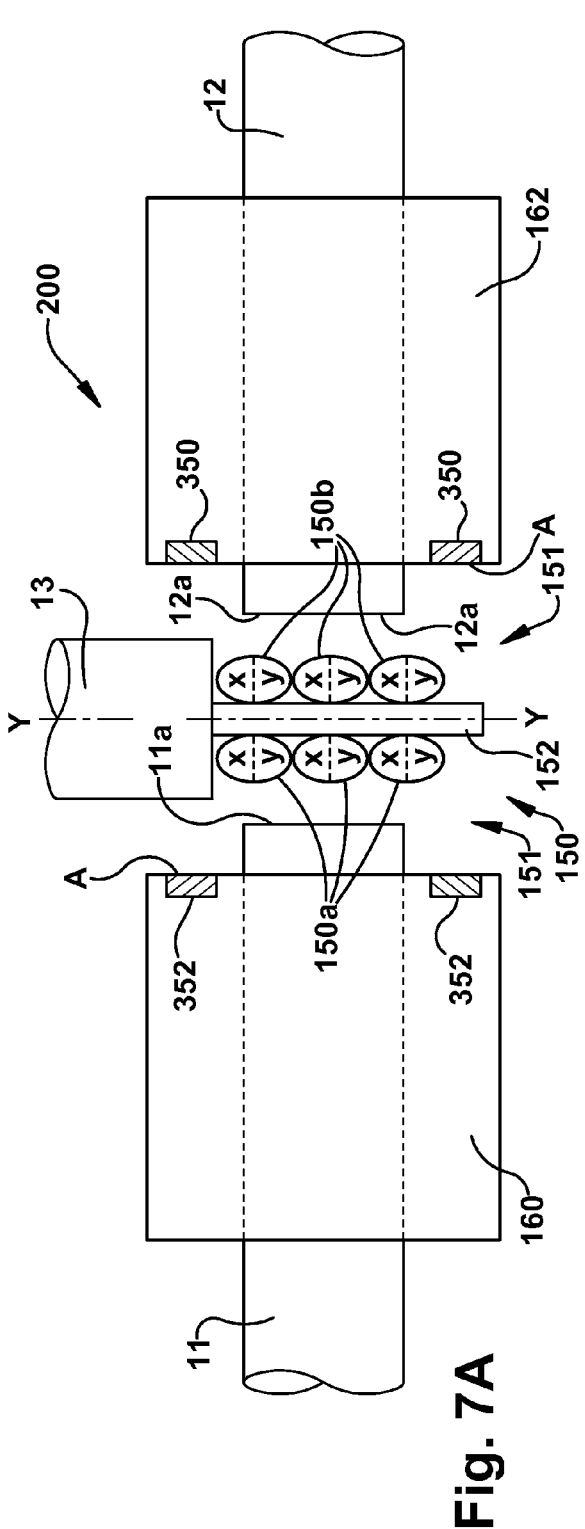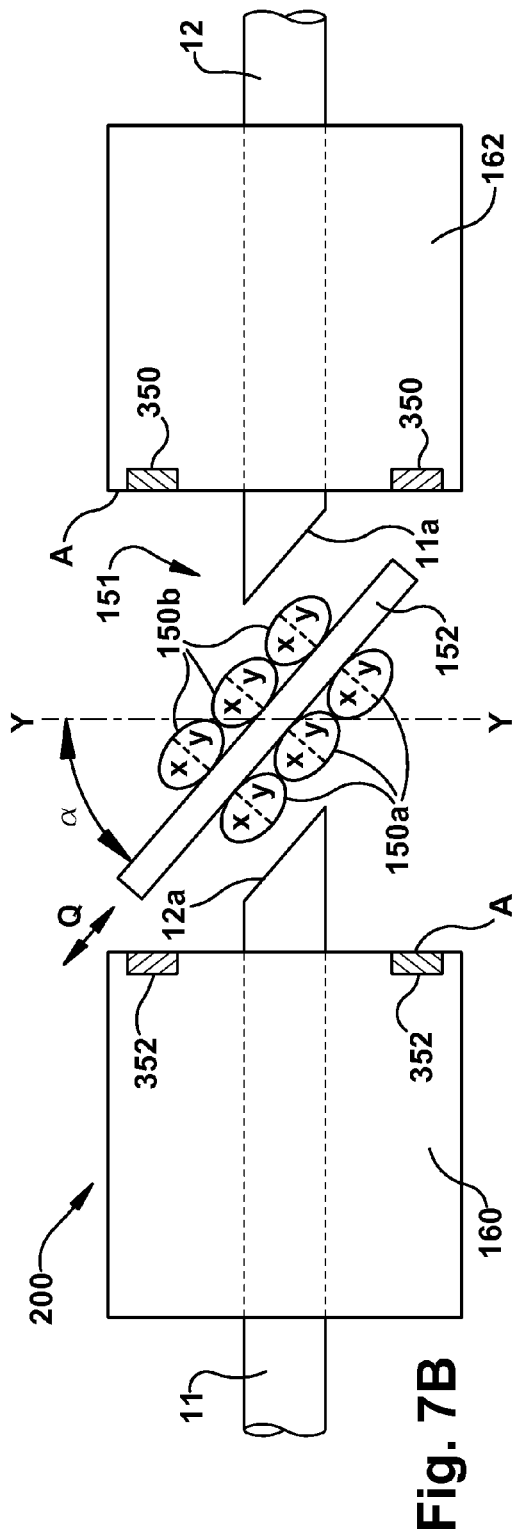
Fig. 7A
Fig. 7B

FLASHLESS WELDING METHOD AND APPARATUS

CROSS-REFERENCES TO RELATED APPLICATIONS

The present application is a Continuation-in-Part application of application Ser. No. 12/364,805 filed Feb. 3, 2009 and entitled FLASHLESS WELDING METHOD AND APPARATUS, that will issue as U.S. Pat. No. 7,861,757 on Jan. 4, 2011, which is a divisional application of application Ser. No. 11/347,142 filed on Feb. 3, 2006 entitled FLASHLESS WELDING METHOD AND APPARATUS, now U.S. Pat. No. 7,503,992. The present application claims priority to the above-identified patent applications and patents, all of such patents and applications are incorporated in their entirety herein by reference for all purposes.

TECHNICAL FIELD

The present disclosure concerns both methods and apparatuses relating to the welding of various materials together generally, and more specifically, it relates to the improvements in the welding process that results in a flashless connection between separate articles or opposite ends of a single article.

BACKGROUND

Several different methods of extruding thermal plastics are well known in the industry, including methods for both cold and hot feed extrusion. By using extrusion technologies such as these, an infinite number of extrusion profiles that can be extruded depending on the shape and contour of the particular die used in the extrusion process. The four most common extrusion profiles are tubing, channel, cord and bulb seals.

Finished extruded material can be made into continuous rolls of varying length, generally referred to in the industry as extrudate. The length of the extrudate roll is typically specified from a customer's stock order. Alternatively, the finished extruded material can be formed to make individual parts that often resemble an endless loop or ring, typically referred to by those skilled in the art and hereinafter as a gasket, a continuous gasket, or an endless gasket. An endless gasket is formed by welding the opposite ends of a single piece of extruded material together to create an endless loop shape. The end products whether originating from extrudate or an endless gasket can include residential weather seals, automotive weatherseals and gap fillers, major appliance seals, construction seals, architectural glazing seals, large diameter pipe seals, and various seals used in equipment or machinery.

During the manufacturing of an endless gasket, extruded material is frequently cut to length for a particular application and then welded together end-to-end to form an infinite number of shapes and sizes. The most common endless gaskets form a rectangular or circular pattern.

It is not uncommon for a break to occur in the extrudate for any number of reasons, including fatigue or stress on the extrusion, depletion of raw materials making up the compound, machine break-down, and/or operator neglect during the manufacturing process. Since the extrudate is sent in rolls conforming to a customer's specified length, a splice is frequently needed in order to make the material, once again, continuous, which avoids the creation of scrap because the extrusion length without out a splice becomes too short to fill the customer's order. A splice may also be needed in the endless gasket product in order to connect two ends of a single extruded piece of material in order to form a continuous ring.

Therefore, a joining process is needed in order to unite opposite ends of a single article to make an endless gasket or to unite separate pieces of extruded material in order to form an extrudate. For example, heat may be applied through a heating element during a welding operation at the extruded material ends. During the joining process a splice results between the ends of two separate extrusions or the two ends of the single extrusion. After the welding operation, the resulting splice can leave an undesirable seam or flash, which is not part of the finished product. This flash is particularly undesirable in extruded profiles that perform a sealing function. In addition, the flash generates extra cost to the product by requiring an additional deflashing operation, either manually by an operator or by a mechanical trimming operation. Trimming the flash can also propagate tears, thereby weakening the welded joint.

The cost associated with trimming and removing flash material from an extruded product can be significant because of the additional operations and/or labor. This cost can be compounded in scrap that is produced when the flash removal results in trimming important parts of the finished product through operator error or machine overshoot in mechanical trimming operations.

SUMMARY

The present disclosure is directed to an improved system for forming a seamless weld between two ends of extruded material, typically thermal plastics, such as and including without limitation, Acrylonitrile-Butadiene-Styrene ("ABS"), Polyvinyl Chloride Plastic ("PVC"), Polystyrene, Polyolefinic materials such as polypropylene, and polyethylene, Thermoplastic Elastomers ("TPE") and other similarly structured composites. The ends are joined to form either an extrudate or endless gasket.

In one exemplary embodiment, first and second extrusion ends are equally spaced against a spacer bar then secured within a clamp and positioned within a corresponding mold. The spacer bar is then retracted, creating a void for the insertion of a heating element. After a prescribed temperature is reached, the heating element is removed and the first and second molds are pushed together, where the molds freely pass over the respective extrusion ends. Once the molds assume a facial contact position, one clamp advances one extrusion end to a mating position, contacting the opposing extrusion end, while the opposite clamp remains stationary having a secured hold on its corresponding extrusion end. After the extrusion ends are in a contacting position, the molds are closed on the still molten material at the weld joint or splice. This compression action either prevents the flash from forming or reforms the flash back into the body of the extrusion cross section. The tooling is then released in conjunction with the clamps moving to an open position for the removal of a now continuous flashless product.

The described process can also be used for attaching corner joints between extrusion ends. Similarly, the corner joints are securely formed in a flashless type connection, resulting in an endless gasket product.

In another exemplary embodiment, the first and second extrusion ends are no longer equally spaced about their respective molds. Instead, the spacer bar allows one of the ends to be offset, extending to a distance greater than the opposing extrusion relative to the face of the mold. The offset distance is controlled by the location of the spacer bar, which acts similar to a physical stop in a fixture. In this particular embodiment, the molds now perform the clamping function previously executed by a separate set of clamps. This is accomplished by keeping one of the clamping molds stationary, while the opposite clamping mold is a mobile mold capable of movement. Within the cavity of the mobile mold is the extrusion end having the greater offset, and at this point, the mold acts as a clamp and securely grips the offset extrusion end. The opposing stationary mold, although in contact with the second extrusion end forming a secure attachment, provides for movement of the second extrusion end.

The mobile mold is then advanced toward the stationary mold, plunging the offset end into the stationary mold making contact and adhering to the opposite extrusion end, while driving it back into the stationary mold. Just prior to the plunging operation the stationary mold was preheated and continues to be heated until the extrusion ends are in contact. After extrusion contact, the stationary mold is cooled, thereby improving both the weld strength and appearance while eliminating flash. The molds are then opened for the removal of a now continuous flashless product In another embodiment, the heating element and spacer bar are combined. This eliminates a processing step and associated manufacturing costs.

In another exemplarily embodiment, a heater mold is located to a proximal side of a clamping mold. The heater mold coacts with a stationary clamping mold for receiving the opposing extrusion end and aids in forming a strong flashless seam between the two ends. The heater mold similarly clamps the two extrusion ends together after contact and is designed to cool in order to enhance the integrity of the connection between the two ends. The heater mold provides more control over the thermal processing of the extruded material by regulating the heating and cooling rates after the extrusion ends are joined. In addition, the heater mold reduces the fluctuation in temperature as the extrusion ends transition to a joining position, thus increasing the strength and seamless appearance in the connection.

Another aspect or feature associated with the use of a heater mold is the elimination of a thermal swelling phenomena that occurs after an extrusion is heated and cooled. It is not unusual for the resulting extrusion to grow because of swelling that occurs from the heating and cooling of the material inside the molds. By under sizing the heater mold cavity to a percentage less than the extrusion's desired cross-sectional area, allows the extruded material to retain the desired specification size typically in existence prior to heating.

In another exemplarily embodiment, a heater mold is located symmetrically about both clamping molds. After each respective extrusion end is loaded into the clamping molds, the heater mold remains spatially located from the extrusion ends at a prescribed distance. The distance being a value that still allows for free movement of the extrusion ends, but provides a position for efficient heat placement. After the heater mold is heated, or alternatively, hot air is directed into the mold between the two extrusion ends, the extrusion ends begin to melt. Both clamp molds are capable of movement and at this point advance the extrusions in concert until contact occurs. The heater mold is then cooled and the molds are then opened for the removal of a now continuous flashless product.

Another aspect of an exemplary embodiment includes the heating of the extrusion ends by utilizing heater bar sleeves, which encompass the joining sections of the extrusion ends. The heating sleeves are slightly offset from the extrusion profile and heat the extruded material along a portion of the extrusion ends. Each sleeve is oversized but follows the profile of the extrusion ends and are spaced to a controlled distance for optimizing the heating process. The heater bar sleeves can be used alone or in combination with a heater bar. After the extrusion ends reach a prescribed temperature, the sleeves are retracted and the extrusion ends are advanced into a heating mold until joining contact is achieved. The heater mold is then cooled and the molds are then opened for the removal of a now continuous flashless product.

Another aspect of an exemplary embodiment includes an apparatus for welding ends of two separate articles or a single article to form a single welded article. The apparatus comprises first and second molds for supporting and clamping first and second ends of at least one article and an infrared heating element for thermally energizing over a prescribed period of time the first and second ends of the at least one article to a welding condition. The apparatus further comprises a regulator for altering the power supplied for energizing the infrared heater over at least a portion of the prescribed period of time to achieve increased electromagnetic radiation penetration into the body of the at least one article beyond the first and second ends. The apparatus also comprises an actuator for advancing the first and second ends into a contacting position to form a single welded article.

Another aspect of an exemplary embodiment includes a method for welding ends of two separate articles or a single article to form a single welded article. The method comprises the step of spacing first and second ends of one or two articles to a prescribed distance and advancing an infrared heater within the spacing between the first and second ends. The method also comprises the step of energizing the infrared heater for a prescribed period of time and altering the power supplied for energizing the infrared heater over at least a portion of the prescribed period of time to achieve increased electromagnetic radiation penetration into the body of the one or more articles beyond the first and second ends. The method further comprises contacting the first and second ends together to form a single welded article.

Yet another aspect of an exemplary embodiment comprises an apparatus for welding an article to first and second pipe members. The apparatus comprises at least one arcuate infrared heating element that during use thermally energizes over a prescribed period of time an article with first and second pipe members to a welded condition. The apparatus also comprises a regulator that during use alters power supplied to the arcuate infrared heater over at least a portion of the prescribed period of time to achieve increased electromagnetic radiation penetration into an article and first and second pipe members to achieve a welded condition.

These and other advantages and features of the exemplary embodiments of the invention are described in detail in conjunction with the accompanying drawings.

BRIEF DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which:

FIG. 7A is a plan view of a welding system heating extrusion end that is constructed in accordance with another example embodiment of the present disclosure;

FIG. 7B is an plan view of a welding system heating extrusion ends that is constructed in accordance with another example embodiment of the present disclosure;

DETAILED DESCRIPTION

Referring now to the figures generally wherein like numbered features shown therein refer to like elements throughout unless otherwise noted. The present disclosure concerns generally both methods and apparatuses relating to the welding of various materials together generally, and more specifically, it relates to the improvements in the welding process that results in a flashless connection between separate articles or opposite ends of a single article.

Figure 1A:
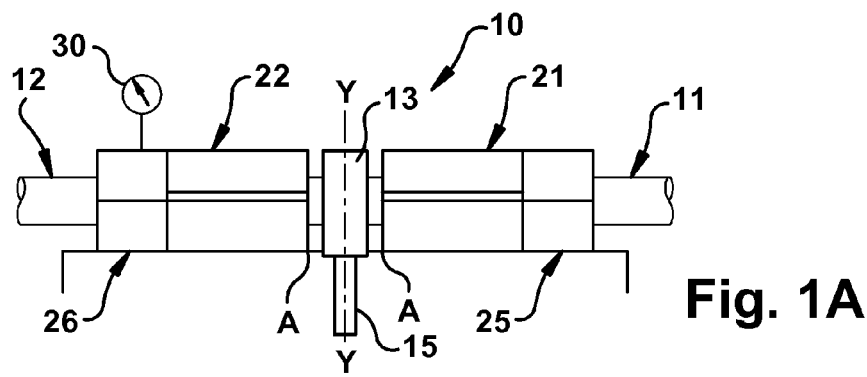
FIG. 1A is an elevation view of the welding system of a first embodiment in an extrusion end loading position.

Calling now attention to FIG. 1A, a schematic depiction of an extrusion welding system 10 is illustrated having a first and a second extrusion end, 11 and 12, respectively placed in a loading position. The extrusions represent the ends of two articles or the opposite ends of a single article. The extrusion may include a gasket having thermal plastic properties requiring a connection to form an endless flashless product. Alternatively, the extrusions may connect two separate extrusions together to form a finished product having separate opposite ends, or include forming an extrudate that requires a connection between two separate extrusions to form a continuous roll stock. Although the term "extrusion end" is used to describe the ends of the article formed in the example embodiments to follow, it will be appreciated by those skilled in the art that the article could be formed by processes other than extruding, including for example, molding, injecting, forging, assembly, drawing, casting, and the like.

The welding system 10 is capable of seamlessly welding extrusion compositions or articles typically classified as thermal plastic material, such as and including without limitation, Acrylonitrile-Butadiene-Styrene ("ABS"), Polyvinyl Chloride Plastic ("PVC"), Polystyrene, Polyolefinic materials such as polypropylene, and polyethylene, Thermoplastic Elastomers ("TPE") and other similarly structured composites, but could also include any other material or compound having similar chemical properties. The welding system is also capable of seamlessly welding an unlimited number of geometrical profiles by designing the extruded material's profile into the welding system molds (mold adaptation), however the extrusion will be represented in the following Figures as being cylindrical, round, obround, off-round, oval, and circular for simplicity.

Figure 1B:
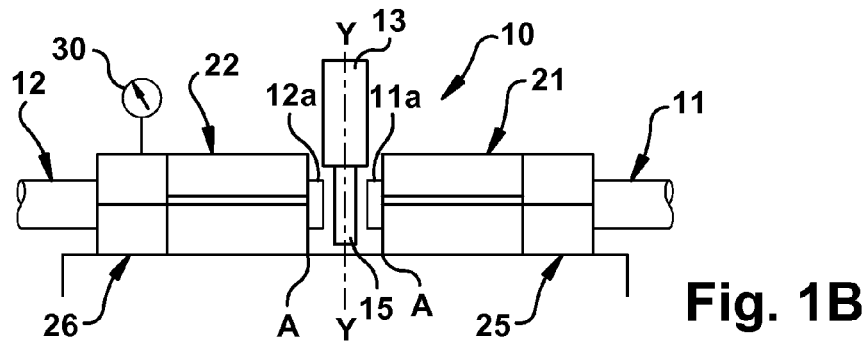
FIG. 1B is an elevation view of the welding system of FIG. 1A in a heating position.

FIGS. 1A-1D depict a preferred example embodiment having pair of extrusion molds 21 and 22, substantially symmetrically located about an imaginary vertical axis depicted as Y-Y. The placement of the first and second extrusion ends are to a point of contact with a spacer bar 13, which acts as a physical stop for the extrusion ends at their joining ends represented by 11a and 12a, as best seen in FIG. 1B. At this point, the molds 21 and 22 are not completely closed over the extrusions, but instead comprise a gap of approximately 0.030" with their corresponding extrusion end.

After the extrusion ends are positioned, a static clamp 25 and moveable or mobile clamp 26 are closed securing the extrusion ends to a fixed first position "A", as shown in FIGS. 1A and 1B. The spacer bar 13 is then retracted creating a void for the insertion of a heating element 15, as shown in FIG. 1B. The heating element can be a number of different devices known by those skilled in the art of extruding materials. Some heating element examples can include, laser heaters, thermal electric resistive heaters (such as infrared ("IR") heaters), and hot air or gas heaters.

Figure 1C:
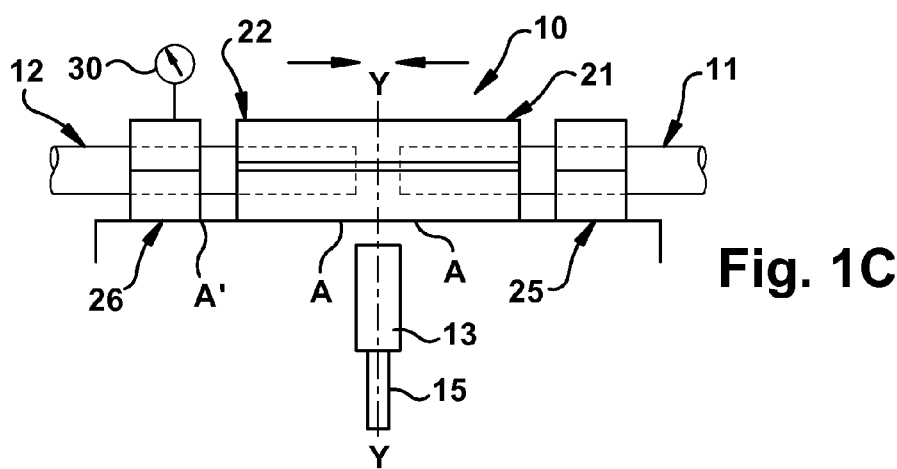
FIG. 1C is an elevation view of the welding system of FIG. 1A in a clamping position.

Although FIG. 1B depicts some distance between the first and second extrusion ends and heating element 15, depending on the material and heat requirements it is possible that the extruded material is capable of being in direct contact with the heating element. After an appropriate melting temperature is reached, having an approximate range between 150-300 degrees centigrade for a typical thermal plastic, the heating element 15 is removed and the molds are advanced to a second facial contact position, freely passing over the extrusion in close proximity as shown in FIG. 1C.

Figure 1D:
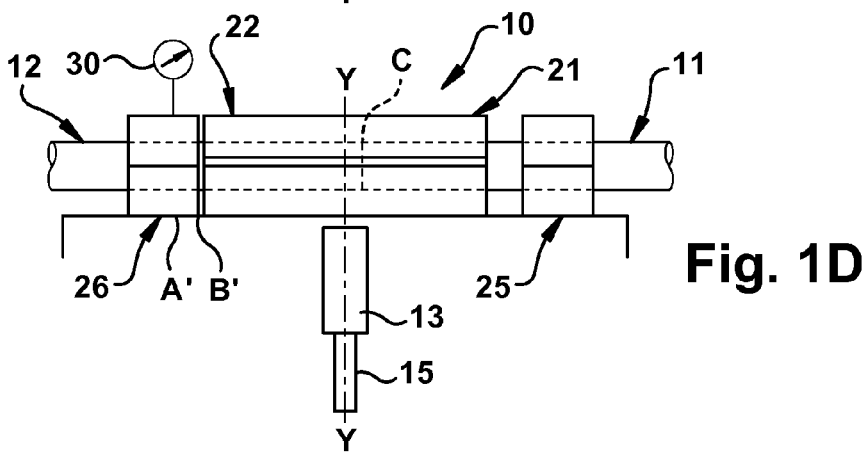
FIG. 1D is an elevation view of the welding system of FIG. 1A in a welding position.

FIG. 1D depicts the joining process where the first and second extrusion ends become welded together to form a continuous flashless connection. Joining of the extrusion ends is achieved by advancing the moveable clamp 26 from a first position "A'" shown in FIG. 1C to a second position directed toward the second mold 22 as depicted in FIG. 1D. Prior to physical contact between the moveable clamp 26 and mold 22, a acceptable resistance pressure 30 is attained, indicating that the contact pressure between the first and second extrusion joining ends are at level for forming a connecting weld between the two extrusions shown at point "C" in FIG. 1D. An acceptable pressure 30 is one that allows sufficient contact for welding thermal plastics. Such pressure is determined by adjusting the pressure applied to the clamps until an adequate bond is achieved. This pressure is therefore, empirically determined. Once the acceptable resistance pressure 30 is attained, the advancement of the moveable clamp 26 stops (represented by position "B'" in FIG. 1D) leaving a slight gap between mold 22 and moveable clamp 26. Molds 21 and 22 are then closed, forming a clamping connection between the two heated extrusion ends. The resistance pressure 30 can be measured by a number of different devices recognizable to those skilled in the art, such as pressure transducers, strain gauges, and linear variable displacement transducers ("LVDT").

After the first and second molds cool to a predetermined temperature, typically ranging from 60 to 80 degrees centigrade for most thermal plastics, the molds are opened and the continuous flashless extrusion is cured for removal.

Figure 2A:
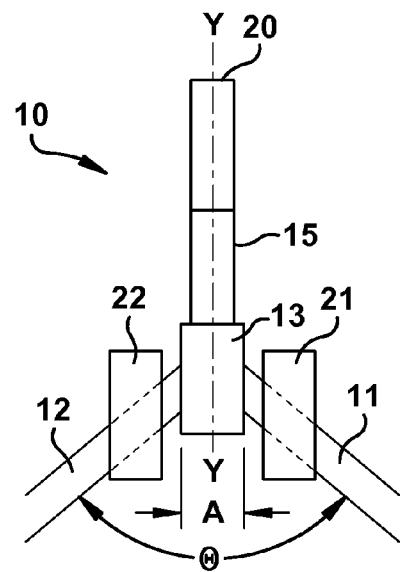
FIG. 2A is an elevation view of the welding system of a second embodiment for making a corner weld with the extrusion ends being presented in a loading position.
Figure 2B:
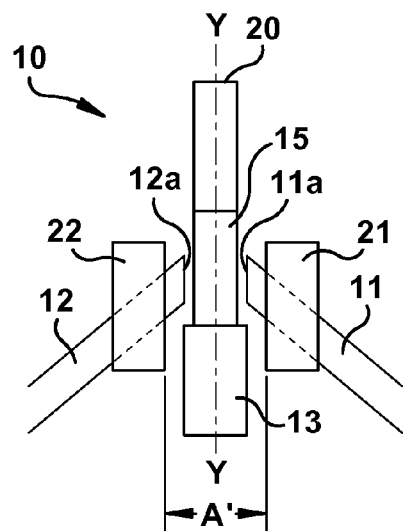
FIG. 2B is an elevation view of the corner welding system of FIG. 2A with the extrusion ends in a heating position.
Figure 2C:
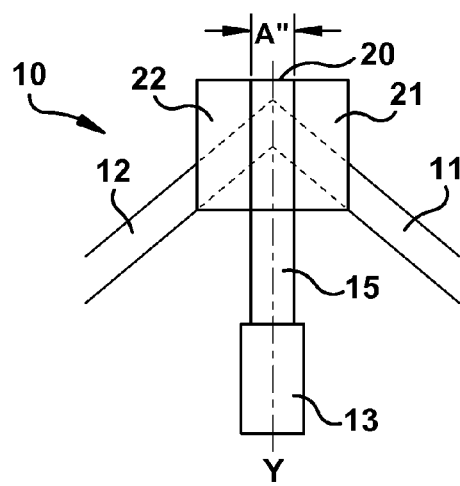
FIG. 2C is an elevation view of the corner welding system of FIG. 2A with the extrusion ends in a welding position.

Referring now to FIGS. 2A-2C is a separate preferred exemplary embodiment representing the above describe flashless welding technique for joining a first and a second extrusion end 11 and 12 in a corner connection. A corner connection is desirable in applications requiring a seamless connection at a prescribed nonlinear angle represented by "θ". One of the most popular applications is for window molding or gasket where θ is equal to 90 degrees. However, it should be understood by those skilled in the art that θ can be at any angle.

Returning to FIG. 2A, the first and second extrusion ends are supported by molds 21 and 22, and are in contact with a spacer bar or stop 13 at a specified first distance "A". The molds are at a first position "A'" that is substantially symmetrical about an imaginary axis represented by Y-Y. Once the extrusions are positioned against the spacer bar 13, the bar is retracted allowing for the advancement of a heating element 15 between the first and second extrusion ends, 11 and 12, as shown in FIG. 2B. As with FIGS. 1A through 1D, any heating device can be used for the heating element 15, including, laser heaters, thermal electric resistive heaters (such as infrared ("IR") heaters), and hot air or gas heaters.

After the heating element elevates the temperature of the extrusion to a melting temperature, typically ranging between 150-300 degrees centigrade for most thermal plastics, the heating element is removed. Shortly thereafter, the molds are advanced to position "A'" in close proximity to the first 11 and second 12 extrusion ends that are also advanced by clamps (not shown) to a point of contact as depicted in FIG. 2C. In concert with the aforementioned mold movement is advancement of a heating mold 20, which is moved forward until achieving a close proximity with the joining ends 11a and 12a of the extrusions. After an acceptable resistance pressure is obtained, the advancement of the extrusions and molds stop, allowing the molds to cool. After the prescribed cooling temperature is reached, the molds and clamps are opened allowing the continuous flashless corner mold to be removed. The combination of plunging, clamping, and cooling the molten extrusion material together prevents a flash from forming on the extrusion, and/or forces any excess material to be formed back into the body of the extrusion.

Another preferred exemplary embodiment is shown in FIGS. 3A-3D. In this embodiment, the extrusion ends 11 and 12 are no longer located symmetrically about the vertical axis Y-Y. Additionally, the first and second molds 21 and 22 are clamping molds replacing the need for separate clamping apparatus.

Figure 3A:
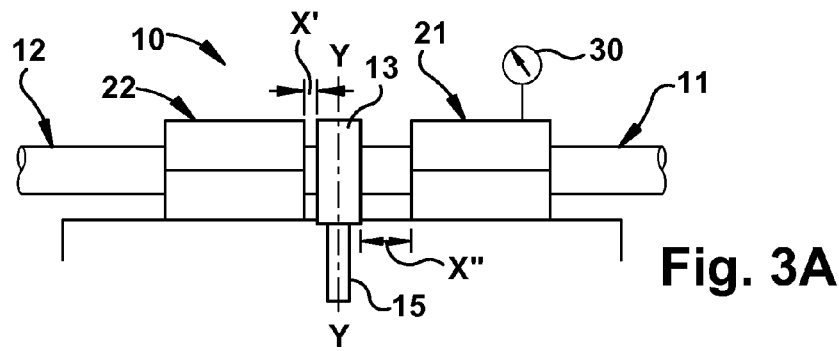
FIG. 3A is an elevation view of the welding system showing a third embodiment with the extrusion ends loaded and spaced in an offset position.

Spacer bar 13 locates the first 11 and second 12 extrusions at an offset distance "X'" and "X''" respectively, as depicted in FIG. 3A. The offset distances vary based on material type and size, however, for a ½ of an inch diameter extrusion, distances X' and X" provided a sufficiently strong welded connection at distances ¼ and ½ of an inch, respectively. For most thermal plastic materials, the heating element 15 should be thermally elevated in order to bring the extruded material to a melting temperature, approximately ranging between 150-300 degrees centigrade, varying only the duration of exposure based on the size of the extrusions. It should be understood by those skilled in the art that the greater the size or surface area of the extrusion ends, the greater the heating exposure duration.

Figure 3B:
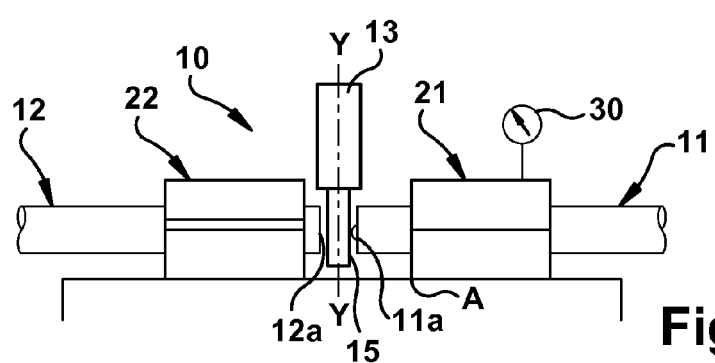
FIG. 3B is an elevation view of the welding system of FIG. 3A with extrusion ends in a heating position.

Referring now to FIG. 3B, once the offset locations of the extrusion ends are positioned, the spacer bar 13 is retracted. Mold 21 now clamps its respective extrusion end, while the second mold 22 remains in close proximity to the second extrusion end leaving a 0.030" therebetween for free movement over the second extrusion end 12. The heating element 15 is then positioned between the extrusion ends for thermal processing. As with the previous embodiments, any heating device can be used for the heating element 15, including, laser heaters, thermal electric resistive heaters (such as infrared ("IR") heaters), and hot air or gas heaters. After a prescribed temperature is achieved at joining ends 11a and 12a, the heating element is removed and clamping mold 21 is advanced from position "A" in FIG. 3B, thereby plunging the first extrusion end 11 into the second stationary mold 22. The advancement of first clamping mold 21 ceases once the prescribed resistance pressure 30 is attained, which is represented by position "A'" in FIG. 3C. The acceptable resistance pressure indicates that the contact between the first 11a and second 12a extrusion joining ends is at a level for a connecting weld represented by splice point "C" in FIG. 3C. Stationary mold 22 now clamps the corresponding extrusion ends for a duration that allows the extrusion ends to cool to a temperature below a softening point of the material, which is typically around 65 degrees centigrade for most thermal plastics. The plunging of the molten extrusion end into the opposing mold along with the continued compression resulting from the clamping until a cooling temperature is reached prevents any flash from forming and/or reforms any potential flash material back into the body of the extrusion, thus enhancing both the integrity and seamless appearance of the welded connection.

Figure 3C:
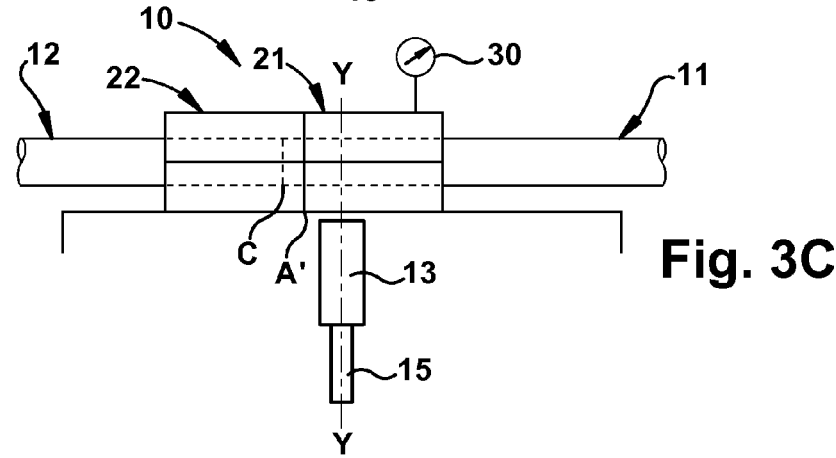
FIG. 3C is an elevation view of the welding system of FIG. 3A with the extrusion ends in a welding position.
Figure 3D:
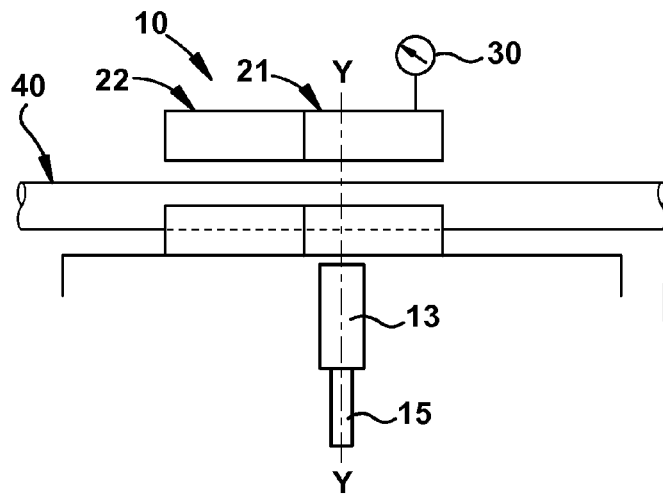
FIG. 3D is an elevation view of the welding system of FIG. 3A with the molds positioned in an extrusion unloading position.

After the joining process of FIG. 3C, a continuous flashless extrudate or endless gasket 40 is considered cured and ready for removal. As such, molds 21 and 22 are raised allowing the ejection of the single piece flashless extrusion 40 as shown in FIG. 3D. After removal the process returns to the operation described and shown in FIG. 3A.

Figure 4A:
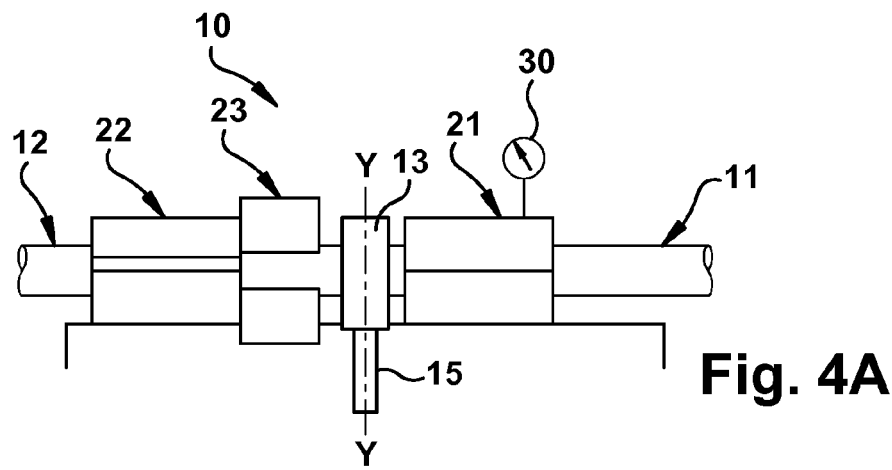
FIG. 4A is an elevation view of the welding system showing a fourth embodiment comprising a separate heater mold.
Figure 4B:
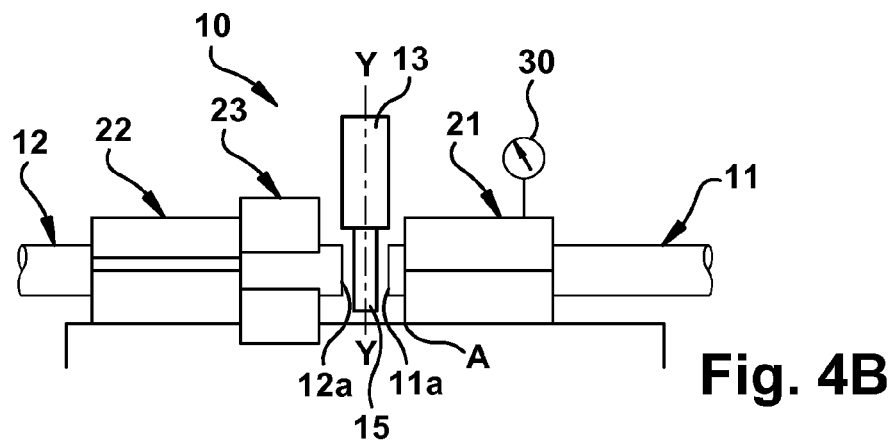
FIG. 4B is an elevation view of the welding system of FIG. 4A with the extrusion ends in a heating position.
Figure 4C:
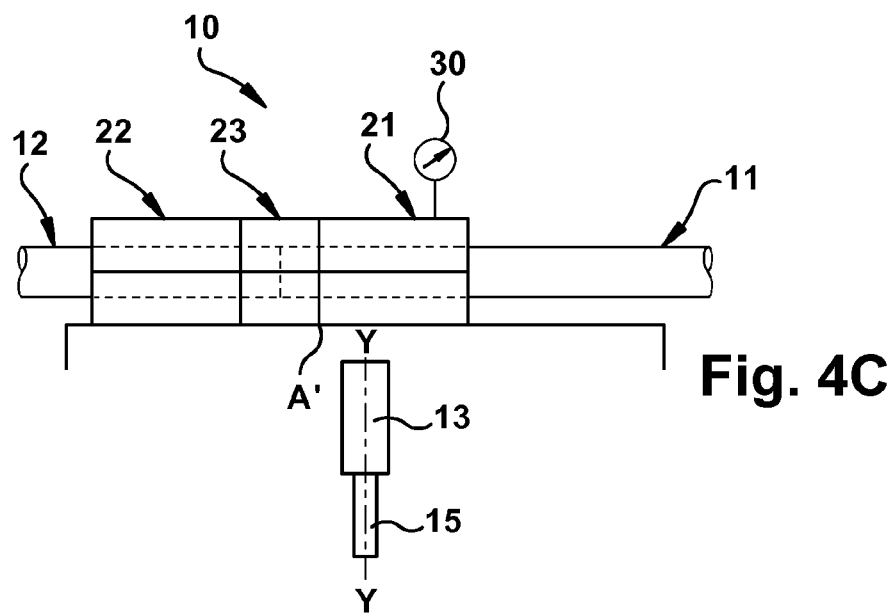
FIG. 4C is an elevation view of the welding system of FIG. 4A with the extrusion ends in a welding position.

Referring now to FIGS. 4A-4C is a preferred embodiment having a separate heater block mold 23 located to a proximal side 22a of stationary mold 22. A first 11 and a second 12 extrusion end are loaded in the molds 21, 22, and 23 and are similarly spaced about spacer bar 13 in either a symmetrical or offset position. Moveable mold 21 then securely clamps first extrusion 11. The spacer bar 13 is then retracted allowing the insertion of heating element 15, which thermally conditions extrusion joining ends 11a and 12a for the requisite duration, while the heater block mold preheats to a temperature approximately ranging between 150-300 centigrade for a typical thermal plastic material. As with the previous embodiments, any heating device can be used for the heating element 15, including, laser heaters, thermal electric resistive heaters (such as infrared ("IR") heaters), and hot air or gas heaters.

After the designed temperature is reached, the heating element is removed and the moveable mold 21 advances from position "A" in FIG. 4B, plunging the first extrusion 11 into stationary mold 22 until the prescribed contact pressure 30 with the second extrusion 12 is reached. FIG. 4C represents achieving the prescribed contact pressure 30 as occurring at position "A'". The heater mold 23 and stationary mold 22 then clamp the extrusion ends. The heater mold 23 was preheated to predetermined temperature prior to the plunging operation. The temperature in the heater mold 23, for example should be elevated to approximately 200 degrees centigrade for a typical thermal plastic material. The incorporation of the heater mold 23 provides more control over the thermal processing of the extruded material during the welding operation by regulating the heating and cooling rates before and after the extrusion ends are joined. In addition, the heater mold 23 reduces fluctuation in temperature as the extrusion ends transition to a joining position, thus increasing the strength and seamless appearance in between the extrusion ends. Further advantages are obtained by using a heater mold 23, such as the elimination of a thermal swelling phenomena that occurs after an extrusion is heated and cooled. It is not unusual for the size of the resulting extrusion to grow because of swelling, which occurs from the heating and cooling of the material inside the molds.

Under sizing the heater mold cavities from 95% to 99.9% of specified extrusion's cross-sectional area eliminates post-thermal swelling. It has been found that a 3% decrease in cavity size or 97% of the desired extruded cross-sectional area to be the preferred reduction. For example, a cylindrical profile extrusion having a desired finished specification diameter of ½" or 0.500", requires the corresponding heater mold cavity to be sized between 0.475" and 0.4995", and preferably 0.485".

After the heating process is complete, the now single flashless extrusion is allowed to cool before removal from the welding system molds. The combination of plunging, clamping, and cooling the molten extrusion material together prevents a flash from forming on the extrusion, and/or forces any excess material to be formed back into the body of the extrusion.

Figure 5A:
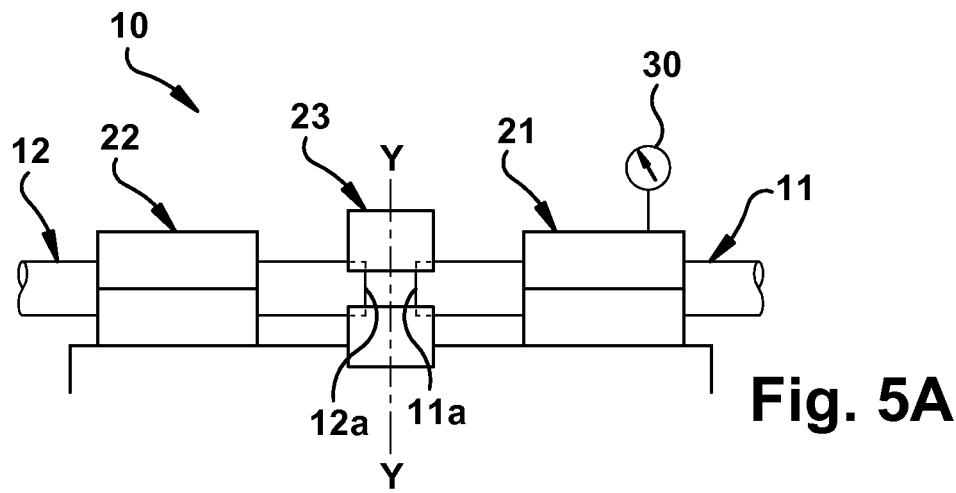
FIG. 5A is an elevation view of the welding system showing another embodiment with a heating mold symmetrically located about the extrusion ends.
Figure 5B:
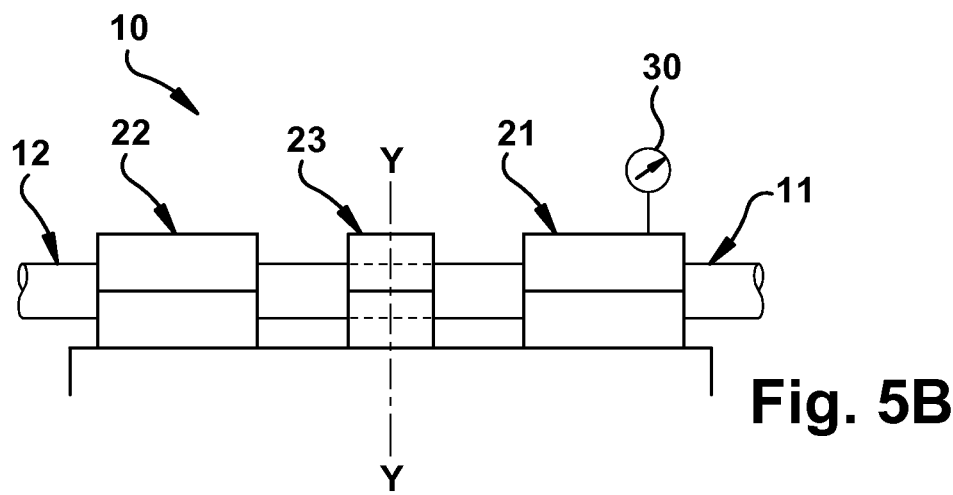
FIG. 5B is an elevation view of the welding system of FIG. 5A showing the extrusion ends encompassed within the heating mold in a welding position.

Encompassing FIGS. 5A and 5B is a separate preferred embodiment, in which a heater mold 23 is symmetrically located between clamping molds 21 and 22. In a first position shown in FIG. 5A, a first 11 and a second 12 extrusion end is loaded within molds 21 and 22, with first joining ends 11a and 12a of the extrusion ends only slightly penetrating heating mold 23. Molds 21 and 22 are then securely clamped on the extrusions, while heating mold 23 remains only in close proximity with the extrusion ends. At such point, heat is applied from the heating mold 23 by hot air, resistive heating, laser heating, gas, or any other conventional method known by those skilled in the art for heating thermal plastic materials.

Once the extrusion joining ends 11a and 12a reach a prescribed melting temperature, the extrusions begin to melt, and clamping molds 21 and 22 are advanced, pushing the respective extrusions together until the prescribed resistive pressure 30 from contact between the extrusion ends is reached. The heating mold 23 then clamps the ends 11 and 12 together until the heating and a subsequent cooling process are complete. The molds are then opened and the continuous flashless extrusion is ready for removal. The combination of heating the mold, advancing the extrusion ends, and clamping to provide continuous pressure on the molten extrusions until the prescribed cooling temperature is reached prevents any flash from forming at the connection of the ends and forces any excess material to be reformed into the body of the extrusion. This welding process enhances both the integrity and seamless appearance of the welded connection.

Referring to FIGS. 6A through 6D is another preferred welding system having a pair of heater bar sleeves 31 and 32. The heater bar sleeves receive and envelop the first 11 and second 12 extrusion ends, as shown through FIGS. 6A and 6B. This is accomplished by advancing the extrusion ends into the sleeves by progressing first and second clamps 21 and 22 to a heating position shown in FIG. 6B.

Figure 6A:
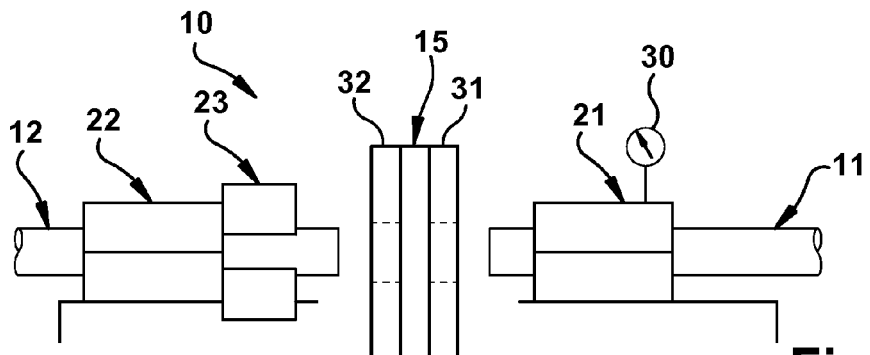
FIG. 6A is an elevation view of the welding system showing an embodiment employing a heating mold and heating sleeves in position for encompassing the extrusion ends.
Figure 6B:
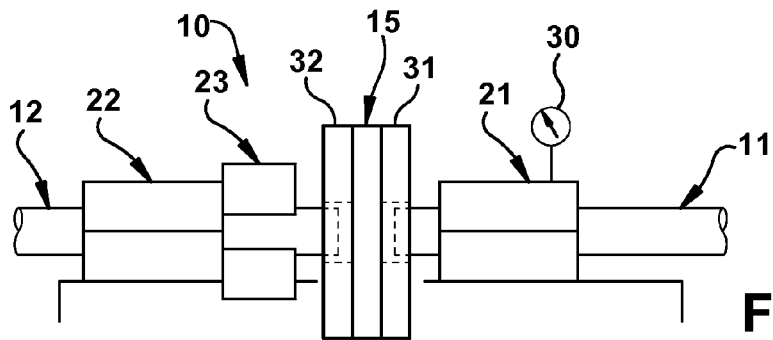
FIG. 6B is an elevation view of the welding system of FIG. 6A with the extrusion ends in a heating position between a pair of heater bar sleeves.
Figure 6C:
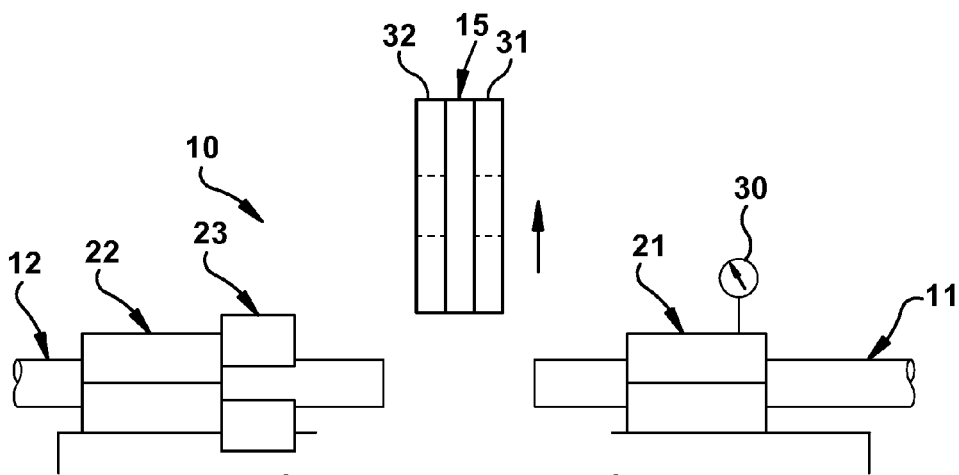
FIG. 6C is an elevation view of the welding system of FIG. 6A where the heating bar and heating bar sleeves are retracted for advancement of the extrusion ends into the heating bar.
Figure 6D:
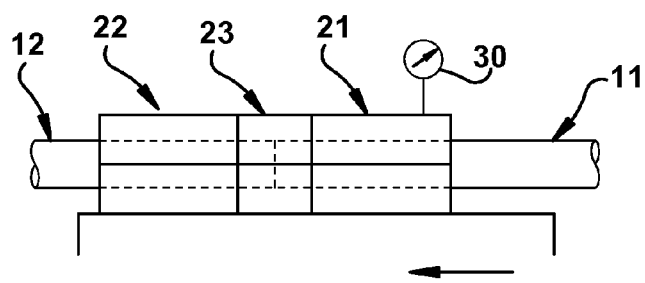
FIG. 6D is an elevation view of the welding system of FIG. 6A showing the extrusions encompassed within the heating mold in a welding position.

The heater sleeve can act in place of a heater bar 15 or in conjunction with the heater bar as shown in FIGS. 6A-6D. If the heater sleeves are used in combination with the heater bar 15, the sleeve temperature can be reduced ranging between 150-300 centigrade to melt the extrusion ends along a linear distance enveloped within the sleeves. Absent the heating bar 15, the sleeves may require a temperature in excess of 250 centigrade. As with the previous embodiments, any heating device can be used for the heating element 15, including, laser heaters, thermal electric resistive heaters (such as infrared ("IR") heaters), and hot air or gas heaters After achieving a melting point on the extrusion ends, the heater sleeves 31 and 32 and in this embodiment, heater bar 15 are retracted as shown in FIG. 6C. The extrusion ends are now capable of advancing to a welding position within a heater mold 23, as shown in FIG. 6D and discussed previously. Advancement of first 21 and second 22 molds ceases once a joining pressure 30 is obtained. The extrusion ends are now welded and cooled to a prescribed temperature within the heater mold, after which a single piece gasket or extrudate can be removed.

The heating sleeves aid in elevating the temperature over a larger and more uniform portion of the extrusion ends. As a result, a more uniform weld is formed increasing the overall weld strength. In addition, the combination of heating the mold, advancing the extrusion ends into a heater mold, and clamping to provide continuous pressure on the molten extrusion ends until the prescribed cooling temperature is reached prevents any flash from forming at the connection of the ends and forces any excess material to be reformed into the body of the extrusion. This welding process enhances both the integrity and seamless appearance of the welded connection.

FIGS. 7A and 7B illustrated an example embodiment of a welding system 200 constructed in accordance with one example embodiment of the present disclosure, wherein a heating element 150 comprises an infrared (IR) heater. The IR heater 150 in the illustrated example embodiment of FIGS. 7A and 7B particularly comprises two (2) banks 151 of three (3) IR heaters 150a and 150b that collectively heat corresponding ends 11a and 12a, respectively. Each heater 150a and 150b faces its corresponding end 11a and 12a of the article to be heated and is supported by a fixture 152. The fixture 152 may extend from a spacer bar 13 that assists in positioning the ends 11a and 12a within first 160 and second 162 clamping blocks. The ends 11a and 12a through the welding system 200 are joined at the ends of two separate articles (separate pieces of material of finite length) or at the ends of a single article to form an endless loop. Whether the welded connection is formed from two separate articles or a single article, the ends of such are equally represented by reference characters 11a and 12a.

The clamping blocks 160 and 162 include a profile of the desired articles 11 and 12 that is slightly under sized to allow for movement of the respective articles and ends 11a and 12a without slippage when clamped. In one example embodiment, the profiles are undersized one (1%) to five (5%) percent the total finished desired cross-sectional area of the article. The clamping blocks in the illustrated example embodiment are made from 4150 steel, but could be made from other materials of similar characteristics. The alternatives for clamping and advancing of ends 11a and 12a already described in FIGS. 1-6 are possible alternative example embodiments intended to be achieved in FIGS. 7-10, including any combination thereof.

Returning to FIG. 7A, a first 11a and a second 12a extrusion end are loaded in the clamping blocks 160 and 162 and are similarly spaced about by the spacer bar 13 in either a symmetrical or an offset position (FIG. 7B illustrates an alternative embodiment that includes the heating of the ends 11a and 12a at an angle transverse to the clamping blocks). The spacer bar 13 is then retracted, allowing the insertion of the IR heating element 150 between the first and second extrusion ends 11a, 12a. FIG. 7B requires the insertion and retraction of the IR heating element 150 to be along the path indicated by arrows "Q".

The IR heating element 150 and heaters 150a and 150b thermally condition extrusion joining ends 11a and 12a and advantageously achieve deep heat penetration into the body of the articles 11 and 12 for the requisite duration, elevating the articles to 200 to 300 degrees centigrade suitable for forming a flashless weld.

In the illustrated example embodiments of FIGS. 7, 8, 9, and 10, each IR heater 150a and 150b includes two emitters "x" and "y" that emit electromagnetic radiation at a wavelength range between 0.7 μm and 400 μm, and for heating the article 11, 12 typically within a wavelength range of 1 μm and 5 μm in order to elevate the temperature of the articles to approximately 200 to 300 degrees centigrade for forming a flashless connection.

Figure 7C:
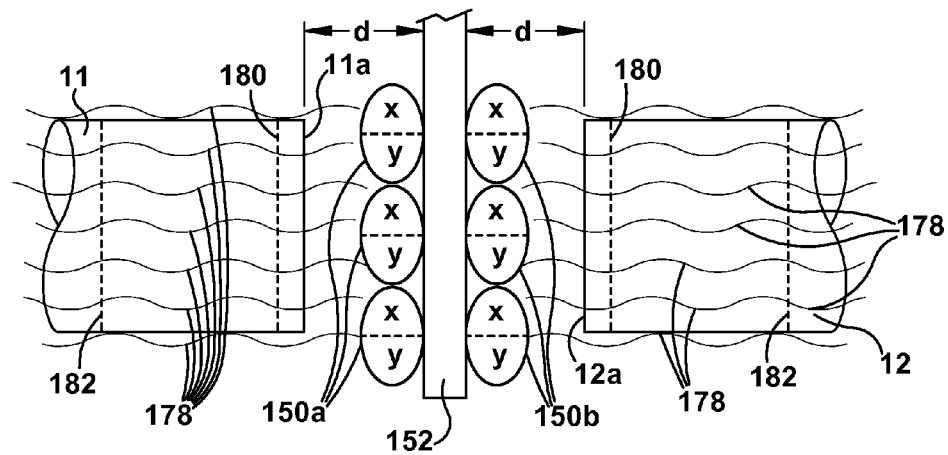
FIG. 7C is a plan view of IR heaters operating to elevate the body of articles in accordance with one example embodiment of the present disclosure.

Each emitter x and y in the illustrated example embodiment at the wavelength described above is a near infrared ("NIR") or short-wave infrared heater that allows advantageously deep heat penetration into the articles 11 and 12 without burning or charring the ends 11a and 12a, as illustrated in FIG. 7C. As illustrated in FIG. 7C, IR heat penetration 178 emitted by the emitters x and y of each IR heater 150a and 150b extends beyond the surface 180 and into the body 182 of a ¾ inch diameter gasket for forming the flashless connection to a temperature ranging between 200 and 300 degrees centigrade.

In one example embodiment, the heat conditioning from the IR heaters 150 penetrate one eighth of one inch (⅛") into articles 11 and 12, and are capable of penetrating into the articles up to one half of one inch (½"). The use of IR heaters 150 as described above in the welding system 200 to join the first and second extrusion 11, 12 is therefore advantageous over prior heating elements because the temperature of the IR heaters can be more readily and rapidly controlled during welding of the first and second extrusion 11 and 12 to produce the most favorable welding conditions, deep penetration, and cured connection.

In the illustrated example embodiment, each IR heater 150a and 150b is a 450 W electrically operated infrared heater or infrared lamp. The IR heaters 150a and 150b are the form of an infrared lamp that includes a filament as the emitting body x and y that is protected by a heat-resistant glass. One suitable example of an IR heater 150a and 150b includes a short wave 450 W twintube stock IR heater sold by Heraeus Noblelight L.L.C. under part number 80010767 for which the specification sheet is incorporated herein by reference. Heraeus Noblelight L.L.C. has a U.S. office at 2150 Northmont Parkway, Duluth Ga. 30096 U.S.A.

Figure 8:
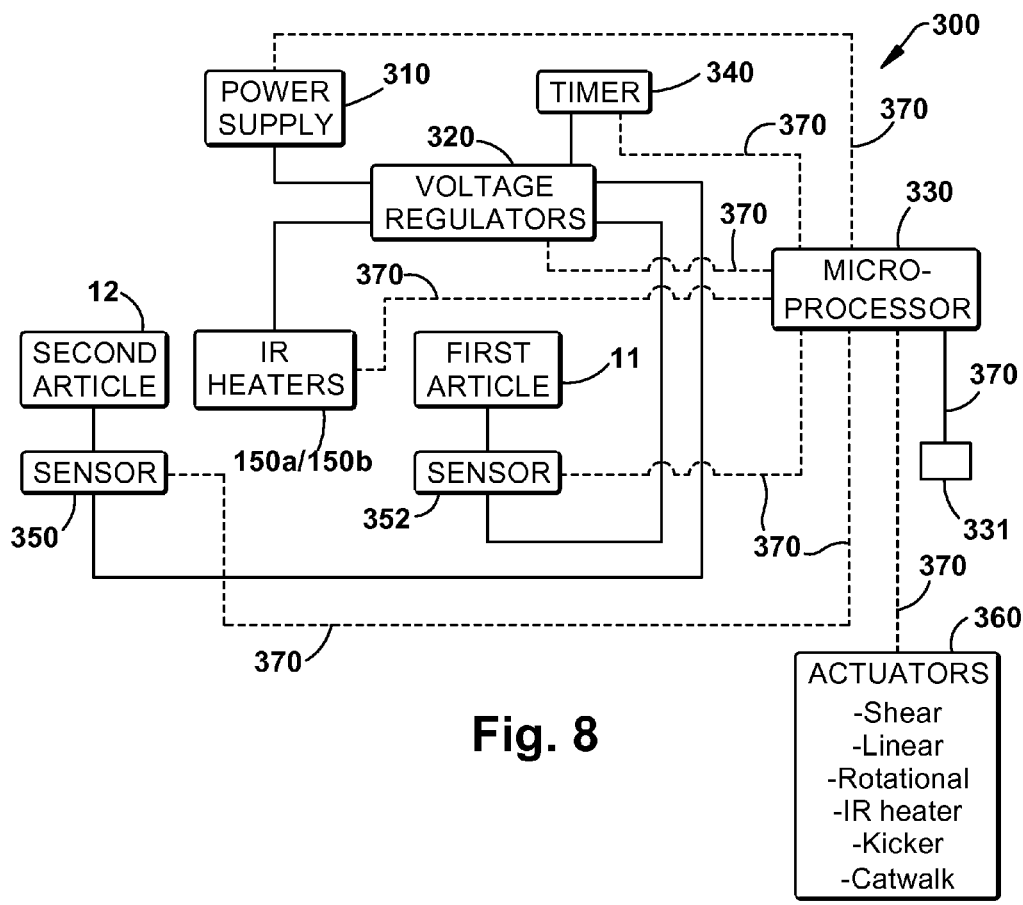
FIG. 8 is a schematic illustration of the welding system shown in FIGS. 7, 9, and 10.
Figure 9:
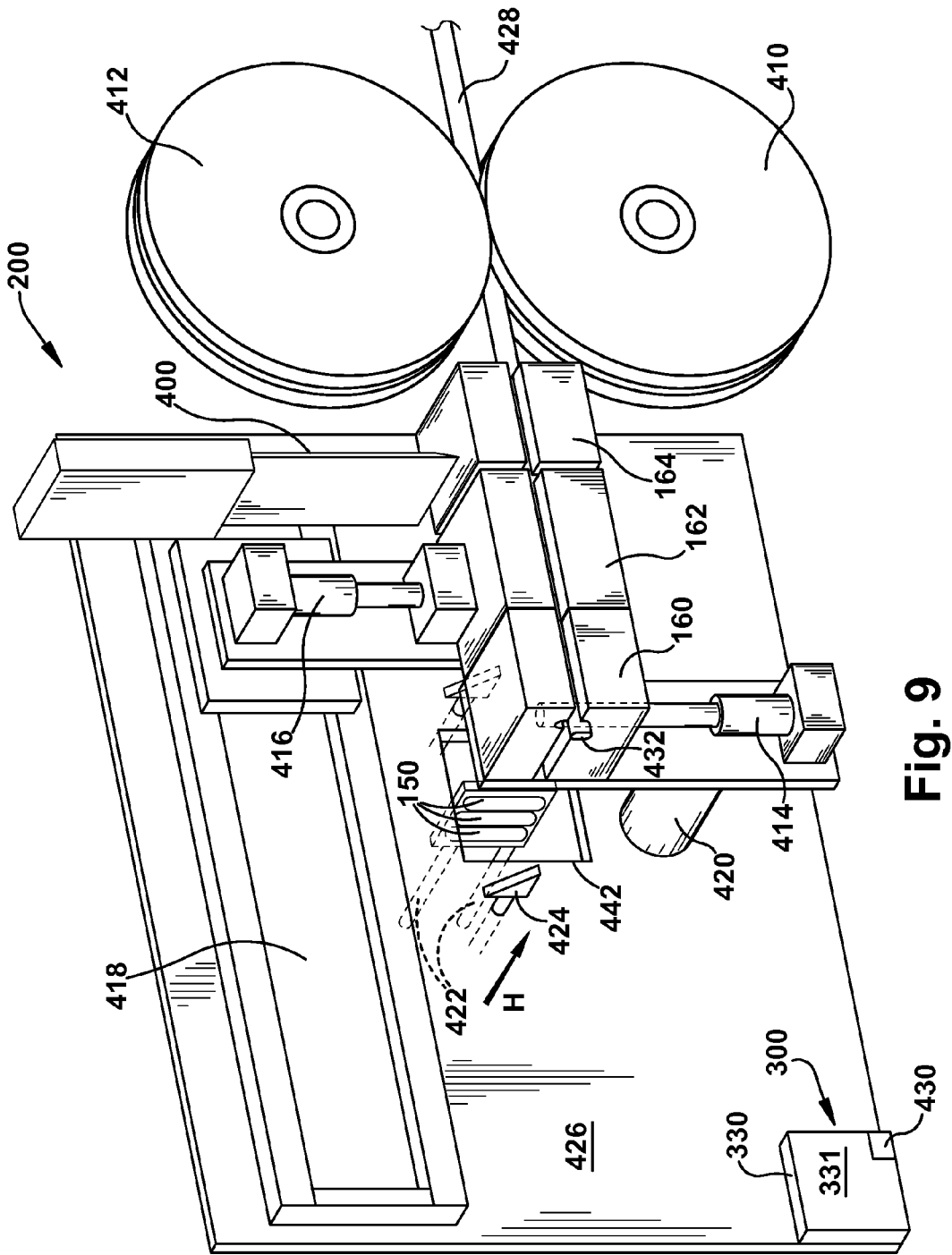
FIG. 9 is an isometric view of the welding system of FIGS. 7 and 10.

The welding system 200 illustrated in the example embodiments of FIGS. 7, 9, and 10 operates in accordance with the control arrangement 300 illustrated in the schematic of FIG. 8. The control arrangement comprises IR heaters 150a and 150b that are coupled to a power supply 310 through a regulator 320 such as a variable resister, rheostat, or voltage regulator. The regulator 320 controls the amount of power supplied to the IR heaters 150a and 150b during the operation of the welding system 200. In particular, alteration of the power via the regulator 320 modifies the energy wavelength or intensity of the radiation emanating from the IR heating element 150 during welding of the first and second articles 11 and 12 in order to improve the welded connection.

In the illustrated example embodiment, two regulators 320 are used, one for each bank 151 that includes three IR heaters 150. Each regulator 320 is a 120V 1 KW maximum regulator compatible with providing a full range of voltages for three 450 W IR heaters 150a, 150b associate with each bank 151. One suitable example of a regulator 320 includes an ATHENA single pole incandescent/halogen dimmer sold under part number T-1000, the specification sheet being incorporated herein by reference.

The regulators 320 are electrically connected with each bank 151 comprising the IR heaters 150a and 150b, and individually control the voltage across each of the lamps or emitters x and y of the IR heaters to generate a particular heating profile over time. By varying the voltage of the IR heaters 150 through the regulators 320 over a prescribed period of time, the thermal penetration of the articles 11 and 12 is significantly increased, allowing the intensity emitters or lamps in each of the IR heaters 150a and 150b, the first and second extrusion 11, 12 can be welded together in a more uniform manner without burning the outer surface of either the first or second extrusion end.

In one example embodiment, the IR heaters 150 include a dwell time of approximately two (2) seconds, wherein two 1000 W regulators 320 are each coupled to three 450 W IR heaters 150a and 150b. The 1000 W regulators at the start of the two second dwell cycle are conditioned at 30-40 percent, providing 300 W-400 W at the start of the cycle to each IR heater 150 that is tapered down over the two second cycle to zero (0) watts. As the power is tapered down over the two second cycle, the IR wavelength is nonlinearly increased, allowing advantageously deeper and uniform volumetric thermal penetration into the articles 11 and 12 without burring or charring of the ends. Thus, a more uniform and relatively stronger welded connection is achieved. Stated another way, the heating of the surface ends 11a and 12a with high intensity at the beginning of the cycle is short to avoid burning and the IR heaters 150 are dimmed over the remainder of the cycle to allow the heat to penetrate the articles 11 and 12.

The control arrangement 300 further comprises a microprocessor 330, a timer 340 (internal or external to the microprocessor 330), sensors 350, 352, and actuators 360. The microprocessor 330 comprises in one example embodiment, a user interface 331 such as a programmable touch screen. The microprocessor 330 is further intended to include a microcontroller, personal computer, programmable logic controller ("PLC"), and the like. One suitable microprocessor 330 includes a Mitsubishi FX3U-16M controller in which the specification sheet is incorporated herein by reference.

The microprocessor 330, as illustrated in the example embodiment of FIG. 8 is in communication via links 370 (either hard-wired or wireless) with the power supply 310, the voltage regulator 320, timer 340, sensors 350, 352, and actuators 360 in order to provide instructions, receive instructions, provide data, and/or receive data therefrom as would be appreciated by one of ordinary skill in the art. Sensors 350 and 352 are located in close proximity (see FIGS. 7A, 7B, and 8) to first and second articles 11 and 12 such that the sensors are capable of reading the temperature near the surface of the articles and to provide the measured temperatures to the microprocessor 330 such that the amount of power supplied to the IR heaters 150a, 150b can be increased or decreased to achieve target heating levels and/or penetration of the articles 11 and 12. The sensors 350 and 352 can include pyrometers, thermal couples, and the like. In one example embodiment, the sensors are mounted into the clamps 160 and 162.

In yet another example embodiment, the target heating levels and/or thermal penetration of the articles 11 and 12 is achieved by the dwell time in which the IR heaters 150a and 150b are emitting electromagnetic radiation at the short wavelength identified above. The dwell time is set by the timer 340 at a prescribed amount, which in an alternative example embodiment can be automatically increased or decreased by the microprocessor 330 based on real-time temperature feedback from the sensors 350 and 352. Stated another way, the regulator 320 receives input from the microprocessor 330 or directly from the sensors 350, 352 and adjusts the intensity of the IR heaters 150a, 150b based on predetermined values. In other words, the regulator 320 receives signals from the sensors 350, 352 indicative of the surface temperature of the first and/or second extrusion 11, 12 and correlates those signals with desired voltage amounts based on, for example, look-up tables programmed into the regulator 320 or microprocessor 330 connected thereto.

In one exemplary embodiment, desired penetration of over one half of one inch is achieved by programming the microprocessor 330 to allow a regulator 320 sized at a 1000 W at 120V AC dedicated to each bank 151 of IR heaters 150a and 150b to operate at approximately 30-40% at startup. The IR heat intensity is controllably tapered down by the microprocessor 330 to 0 watts non-linearly over a two-second dwell time. Such controlled tapering over a prescribed dwell time prevents burning of the outer surfaces of the extrusion ends 11a, 12a while maintaining an intensity of IR sufficient to continue heating the extrusion 11 and 12 to a desired penetration depth.

In the above example embodiment, each bank 151 coupled to the regulator 320 included three (3) 450 W bulbs. In addition, the spacing between the IR heaters 150a, 150b from the ends 11a and 12a is approximately one (1") inch as indicated by dimension "d" in FIG. 7C. The extrusion 11 and 12 was approximately three quarters ¾" of one inch in diameter.

In yet another example embodiment, the microprocessor 330 may control independently the dwell time and/or power amount supplied to the IR heaters 150a, 150b individually to each heater or to each emitter x and y independent of other heaters and emitters. As well, such control and independent operation of the emitters x and y may be a function of the data collected by one or more sensors 350, 352.

Referring now to FIG. 9 is a perspective view of a welding system 200 constructed in accordance with one example embodiment of the present disclosure. The welding system 200 comprises first 160, second 162, and third 164 clamping blocks, shear 400, feed rollers 410, 412, linear actuators 414, 416, catwalk actuator 418, rotational actuator 420, IR heater actuator 422, kick actuator 424, and control arrangement 300. One or more of the elements forming the welding system 200 are in communication with the control arrangement 300 that includes the visual display or programmable user interface 331. In addition, the elements forming the welding system are mounted (either movably or affixed) to a main fixture 426.

All of the actuators identified above, namely linear actuators 414, 416, catwalk actuator 418, rotational actuator 420, IR heater actuator 422, kick actuator 424, and feed rollers 410, 412 are collectively represented in the control arrangement 300 by actuator control block 360 and are in communication with the microprocessor 330 of the control arrangement through links 370. The actuators collectively represented by control block 360 are capable of receiving and/or transmitting instructions to/from the microprocessor 330 via programmable software, firmware, volatile memory, nonvolatile memory, remote access memory, and the like.

During operation, a stock roll of material 428 forming the articles 11 and 12 is fed in the direction of arrow "B" through feed rollers 410 and 412. The material 428 in one example embodiment includes thermal plastic material, such as and including without limitation, Acrylonitrile-Butadiene-Styrene ("ABS"), Polyvinyl Chloride Plastic ("PVC"), Polystyrene, Polyolefinic materials such as polypropylene, and polyethylene, Thermoplastic Elastomers ("TPE"), but could also include any other type of material having a similar reaction when exposed to the IR heaters 150a and 150b as described. An encoder 430 in communication with the microprocessor 330, counts the revolutions of at least one of the feed rollers 410, 412, such that the start and stopping points of a desired length of material 428 is calculated.

Figure 10A:
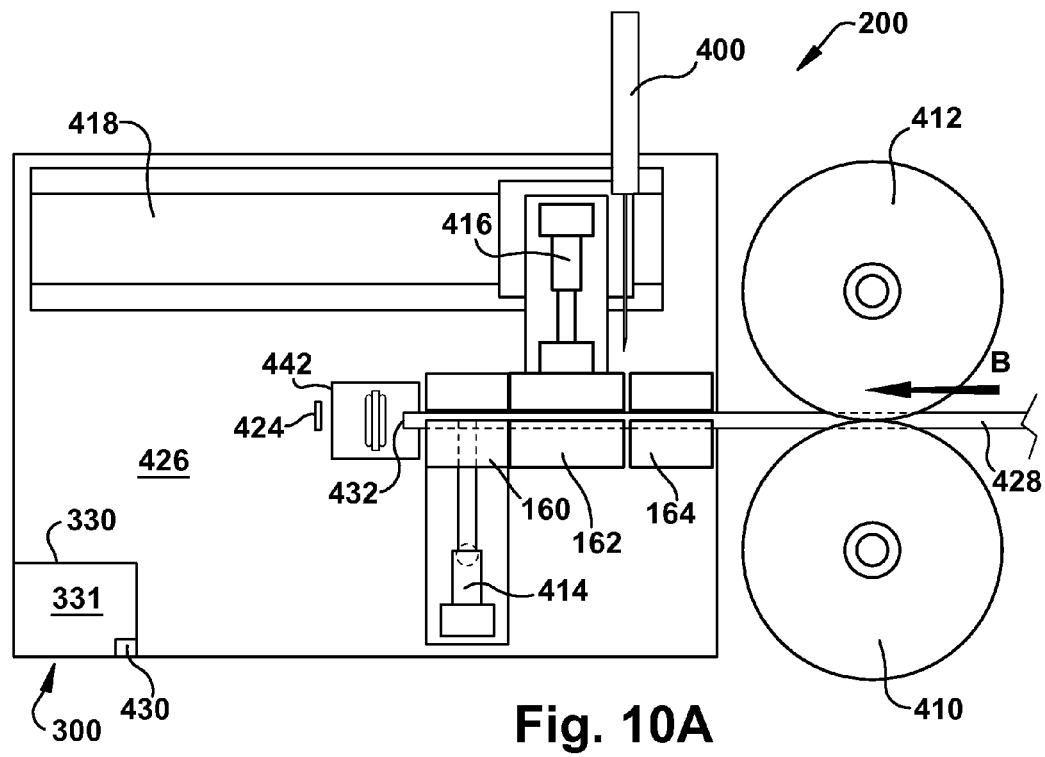
FIG. 10A is a front view of the welding system of FIGS. 7 and 9, illustrating a first phase in a process for forming a flashless connection in accordance with one example embodiment of the present disclosure.

Operation of the welding system is initiated by the clamping the first clamping block 160 on a first end 432 of the material 428 as illustrated in FIG. 10A. Clamping blocks 160, 162, and 164 are engaged and released by linear actuators such as cylinders that can be either pneumatic or hydraulic upon receiving instructions from the microprocessor 330 programs as appreciated by one of ordinary skill in the art. Linear actuator 414 in the form of a pneumatic cylinder directs first clamping block 160 to engage the material at the first end 432 upon instruction from the microprocessor 330.

The material 428 is then fed through the feed rollers 410, 412 to a desired amount programmed into the microprocessor 330. As the material 428 is fed through the feed rollers 410, 412, in the direction of arrow B, a motor (not shown) operating one or both feed rollers 410, 412 is stopped when the desired amount is reached. The desired amount can change by altering values associated with the material length programmed in the microprocessor 330, as would be appreciated by one of ordinary skill in the art. As the desired amount of material 428 is being fed through the feed rollers 410, 412, the linear actuator 414 is rotated about point "C" in the direction of arrow "D" shown in FIG. 10B. The linear actuator 414 and material 428 are rotated by the rotational actuator 420 concomitantly with the speed of the feed rollers 410 and 412 in such a way that slack in the material 428 is advantageously formed in a loop "L" shown in FIG. 10B. The loop L prevents bunching or tension in the material 428 due to variations between the feed rate of the material 428 by the feed rollers 410, 412 and the rotation of the linear actuator 414. The rotational actuator 420 in the illustrated example embodiment is a servo-controlled rotational motor that receives operational instructions from the microprocessor 330 via link 370 to actuator 360 in the control arrangement 300. The actuator 360 in the schematic of FIG. 8 represents: the linear actuators 414, 416; the shear 400; the catwalk actuator 418; IR heater actuator 422; and kicker actuator 424.

Figure 10B:
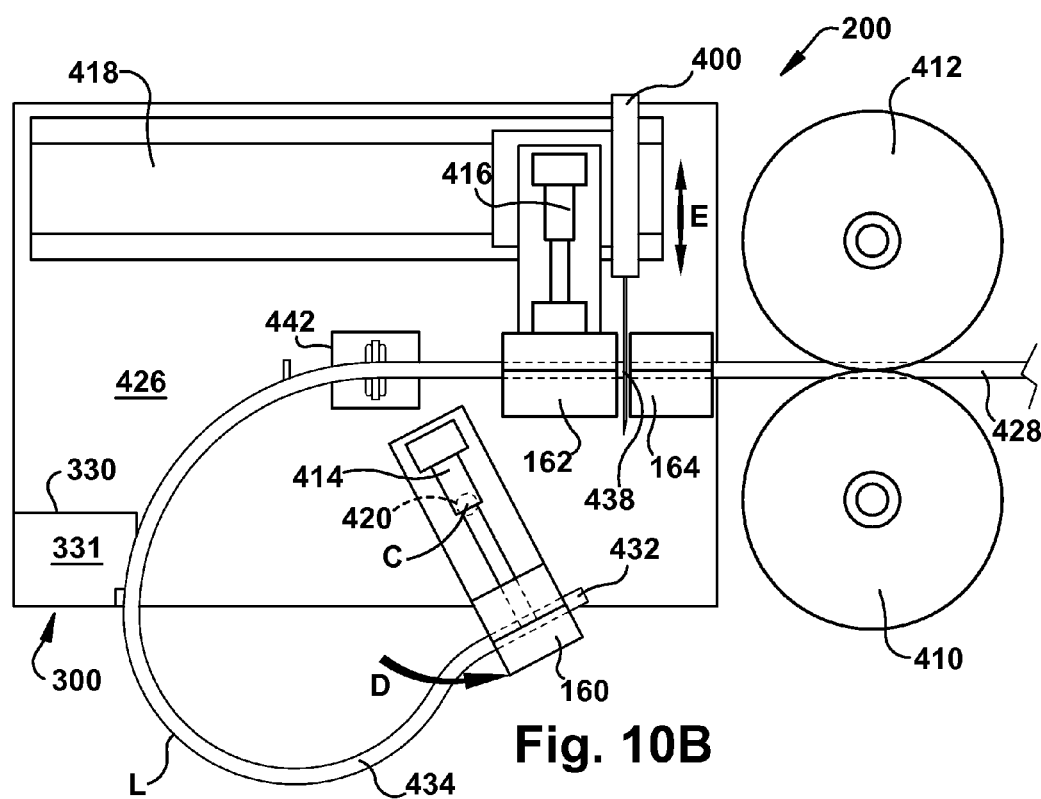
FIG. 10B is a front view of the welding system of FIGS. 7 and 9, illustrating a second phase the process for forming a flashless connection in accordance with one example embodiment of the present disclosure.

When the prescribed amount of material 428 is fed into the welding system 200, the feed rollers 410 and 412 are programmed to stop by the microprocessor 330 and the second linear actuator 416 (in the form of a pneumatic or hydraulic cylinder) clamps the material 428 with the second clamp 162. The third clamping block 164 then clamps the material 428 during the shearing operation. The shear 400 attached to a cylinder is advanced and retracted in the direction of arrow "E" in FIG. 10B. The shear slices the material 428, forming a finite length article 434 separate and apart from the stock roll supplying the material 428. The finite length article 434 comprises first and second ends 432 and 438, respectively as illustrated in FIG. 10B. The article 434 becomes an endless loop 440 having a flashless weld 436 formed at first and second ends 432, 438 when processed by the steps shown in FIGS. 10C and 10D.

Figure 10C:
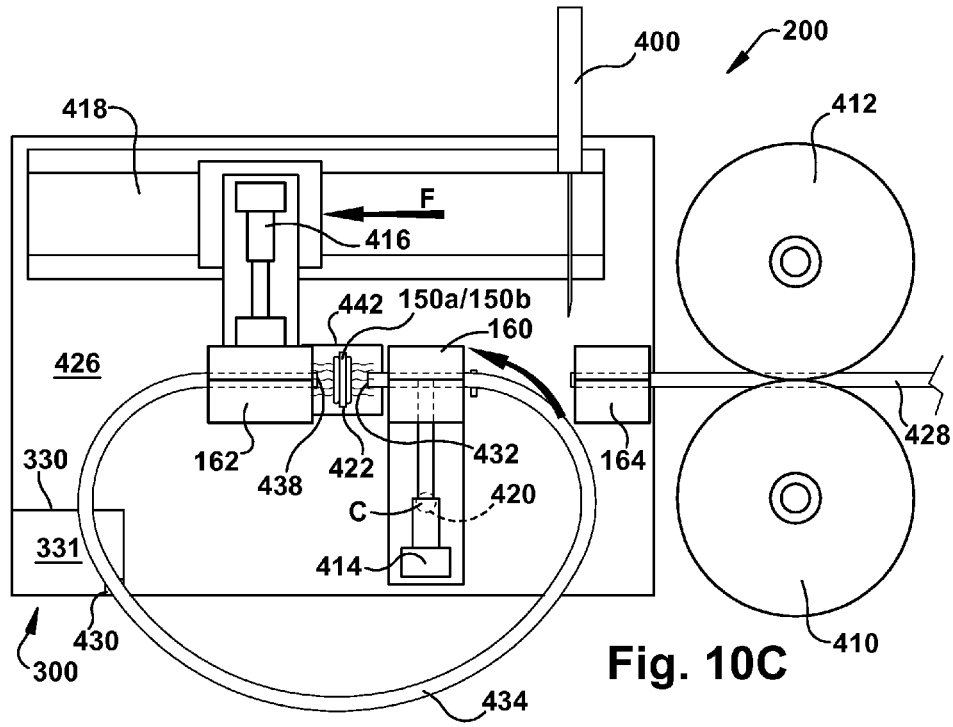
FIG. 10C is a front view of the welding system of FIGS. 7 and 9, illustrating a third phase the process for forming a flashless connection in accordance with one example embodiment of the present disclosure.
Figure 10D:
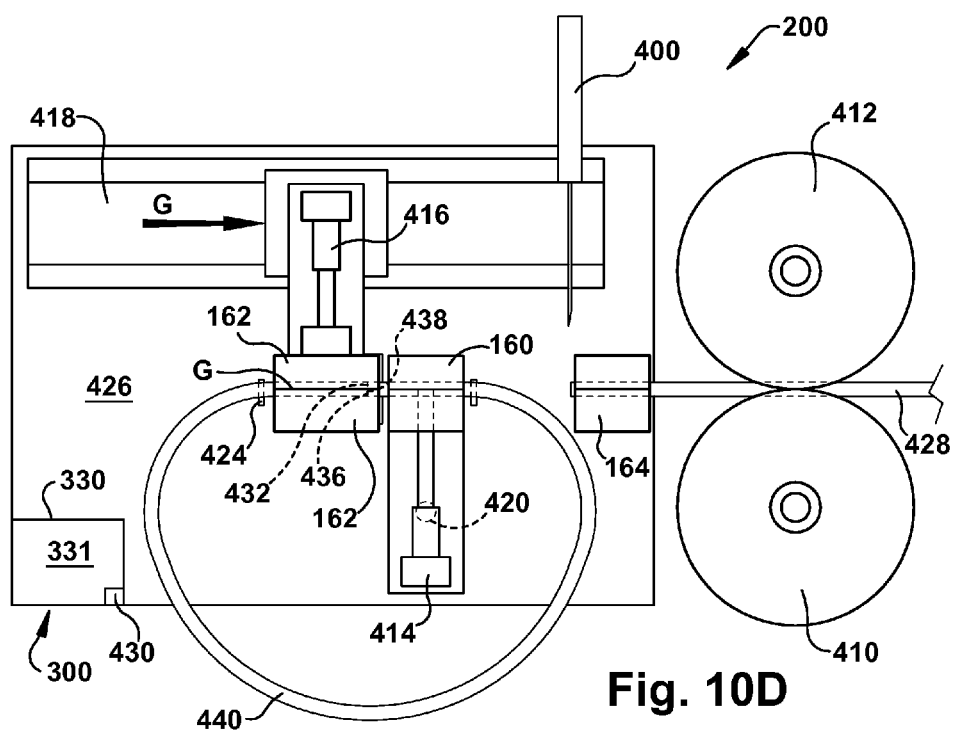
FIG. 10D is a front view of the welding system of FIGS. 7 and 9, illustrating a fourth phase the process for forming a flashless connection in accordance with one example embodiment of the present disclosure.

While the first linear actuator 414 is being rotated by the rotational actuator 420 and subsequent to the shearing operation performed by the shear 400, the second linear actuator 416 is translated in the direction of arrow "F" in FIG. 10C along catwalk actuator 418. This allows the first actuator 414 to be rotated 360 degrees, returning to the home position of FIG. 10A once more as shown in FIG. 10C. In one example embodiment, the catwalk actuator 418 is a double acting pneumatic cylinder in which the timing, movement, and speed are controlled by the microprocessor 330. In the illustrated example embodiment, the catwalk actuator 418 is a Mitsubishi AC servo motor sold under part number HF-KP13 in which the specification sheet is incorporated herein by reference.

During or at the completion of the movement of the first and second linear actuators 414 and 416 by the rotational actuator 420 and catwalk 418 actuators illustrated in FIG. 10C, the IR heater actuator 422 is advanced through an opening 442 in main fixture 426 such that the IR heaters 150a and 150b are equally positioned (see dimension "d" in FIG. 7C) between the ends 432 and 438 so that heat conditioning is applied at the prescribed amount to allow sufficient IR penetration into the article 440 to form a flashless connection. In the illustrated example embodiment, the distance d is approximately one inch and the IR heater actuator 422 is pneumatic cylinder supported by guide rails, but could equally be a ball screw or other linear translation device without departing from the spirit and scope of the present disclosure.

In the illustrated example embodiment, the IR heaters 150 are retracted by the IR heater actuator 422 at the completion of the heating stage illustrated in FIGS. 7C and 10C to allow the flashless connection to occur between ends 432 and 438. While the flashless bonding between ends 432 and 438 can be achieved by any of the aforementioned example embodiments of FIGS. 1-6, the illustrated example embodiment of FIG. 10D most resembles that of the example embodiment of FIGS. 3A-3D. That is, the distance of the end 432 extending beyond clamping block 160 is greater than the distance of the end 438 extending beyond clamping block 162. Clamping block 160 remains closed while clamping block 162 allows a slight gap "G" for a limited-slip movement into the clamping block of end 438. This limited-slip movement of the end 438 occurs when the clamping block 162 is advanced by the catwalk actuator 418 in the direction of arrow "G" in FIG. 10D to receive first end 432 until contact is made with end 438 to form a flashless connection (as further described in the example embodiment of FIGS. 3A-3D). Upon contact between the two ends, the gap G is eliminated by the closing of clamping block 162 to form the flashless connection 436.

Once the flashless connection 436 is made and cooled, clamping blocks 160 and 162 are opened and the catwalk actuator 418 again moves linear actuator 416 in a direction opposite that of arrow G to allow a space between clamping blocks for the upward movement of kicker actuator 424 to pass through opening 442 and eject the finished flashless article 440 from the clamping blocks and welding system 200 into a shipping container (not shown).

After the article 440 is removed from the welding system 200, the linear actuator 414 is rotated back in a direction opposite arrow D of FIG. 10B while the catwalk actuator 418 returns the linear actuator 416 to the original start positions relative to actuator 414, as shown in FIG. 10A. Once the original start positions of FIG. 10A are reestablished, the processes shown in FIGS. 10A-10D can be reinitiated to form another flashless article 440.

In yet another example embodiment, the clamping blocks 160, 162, and 164 are multi-tooled to hold and weld more than one flashless article 440. In accordance with the multi-tooled example embodiment, the feed rollers 410 and 412 and number of IR heaters would need to be increased to accommodate the simultaneous welding of multiple flashless articles 440.

Figure 11:
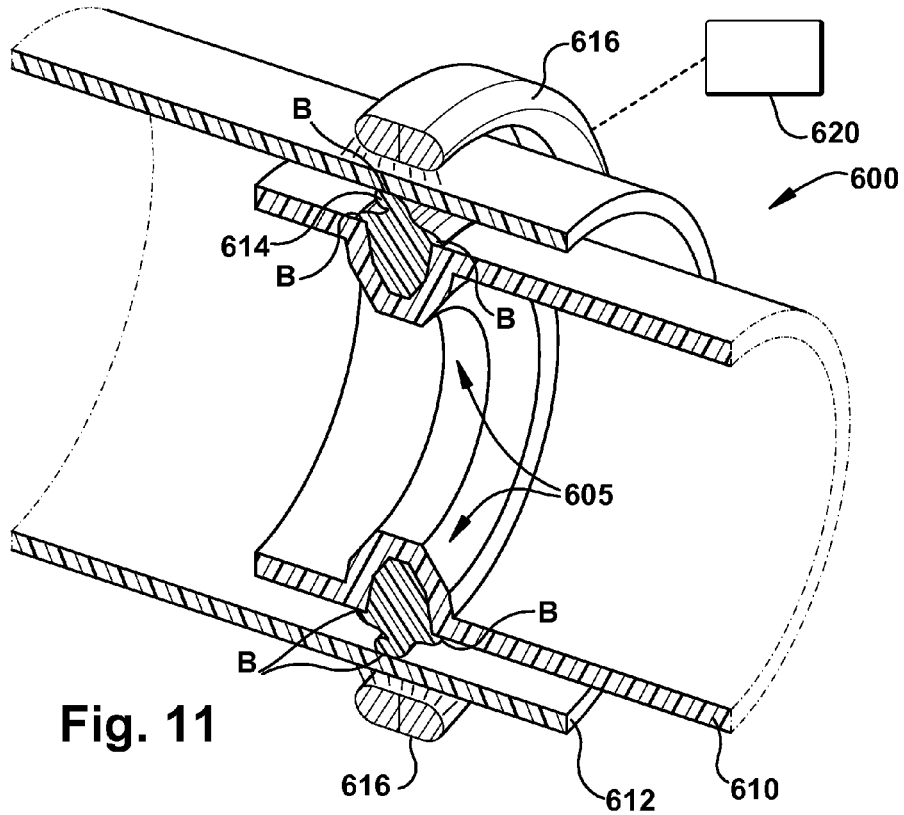
FIG. 11 illustrates another welding system constructed in accordance with another example embodiment of the present disclosure.

FIG. 11 illustrates a welding system 600 constructed in accordance with another example embodiment of the present disclosure wherein a IR heater is used to form a bonded connection between an annular gasket and two pipe members surrounding the gasket. In particular, the welding system 600 forms a bond or sealing connection 605 (also represented by reference characters "B") between a gasket 614 located between a first pipe member 610 and a second pipe member 612. The type of gasket, profiles, and interrelationship between pipe members for forming a sealing connection is further discussed in Applicant's U.S. Pat. No. 7,469,905 entitled PERMANENTLY LUBRICATED GASKET and Applicant's U.S. Pat. No. 6,550,775, entitled ANNULAR GASKET, both of which are incorporated herein by reference in their entireties.

In the illustrated example embodiment, the welding system 600 uses a short wave or NIR IR heater 616 that is arcuate in shape to surround the exterior of the outermost pipe 612. The IR heater 616 in another example embodiment is an annular shaped IR heater. Illustrated in FIG. 11 is partial-section perspective view of the pipe members 610, 612, gasket 614 and annular IR heater 616. In another example embodiment, the IR heater is coupled to a regulator 620 to vary the power to allow for penetration between the pipe members and gasket to form a welded seal bond therebetween. In one example embodiment, the regulator 620 is a voltage regulator that increases the IR wavelength to achieve greater heat penetration between the pipe members 610, 612, and the gasket 614. A clamp then presses the softer gasket 614 into the pipe members 610 and 612 once the IR heating operation is complete. In one example embodiment, the clamp and IR heater 616 are constructed from the same device as shown in FIG. 11. In another example embodiment, a separate arcuate clamp surrounding the outer-most diameter of the gasket 614 and pipe members 610 and 612 (either automatically or manually) compresses the gasket into the pipe members subsequent the IR heating operation.

The welding system 600 is used to form the sealing connection 605 at a plant where piping is manufactured such as an OEM. Alternatively, the welding system 600 is used in the field where piping is installed or for repairs.

Figure 12:
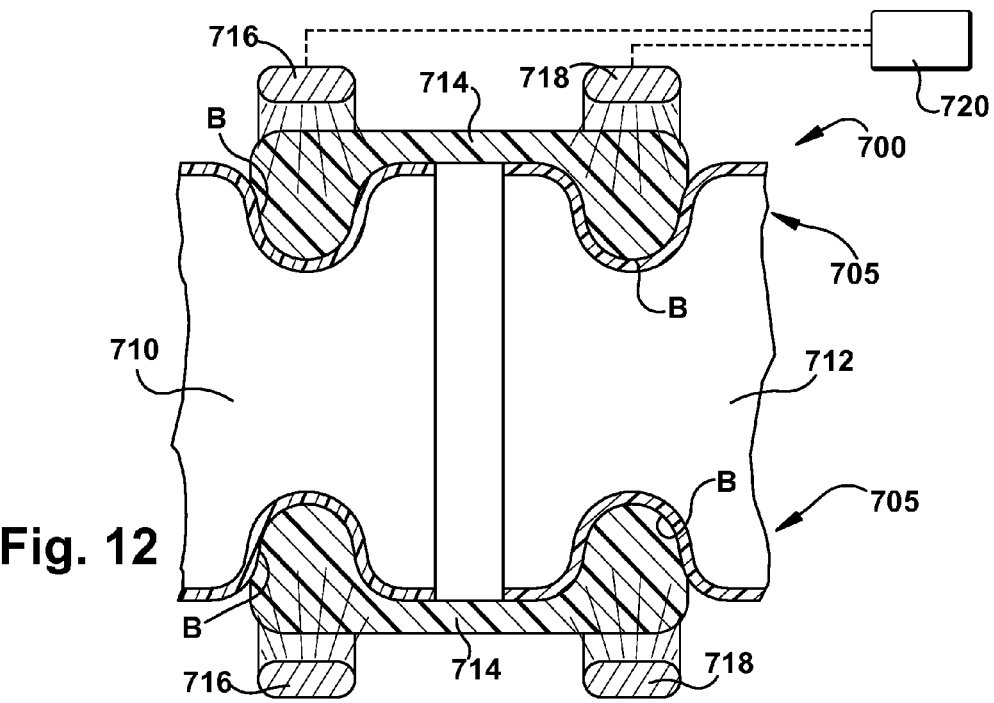
FIG. 12 illustrates another welding system constructed in accordance with another example embodiment of the present disclosure

FIG. 12 illustrates a welding system 700 constructed in accordance with another example embodiment of the present disclosure wherein an IR heater is used to form a bonded connection between an annular coupler and two pipe members connected by the coupler. In particular, the welding system 700 forms a bond or sealing connection 705 (also represented by reference characters "B") between a coupler 714 and a first pipe member 710 and a second pipe member 712. The type of coupler, profiles, and interrelationship between pipe members for forming a sealing connection is further discussed in Applicant's U.S. patent application Ser. No. 12/471,576 entitled PIPE COUPLING ASSEMBLY that was filed on May 26, 2009 and published under U.S. Patent Publication Number US 2009-0295153 A1 (hereinafter "the '153 Publication"). The '153 Publication is incorporated herein by reference in its entirety.

In the illustrated example embodiment, the welding system 700 uses a two short wave or NIR IR heaters 716 and 718 that are arcuate in shape to surround the exterior of the coupler 714 and respective pipe. The IR heaters 716 and 718 in another example embodiment are annularly shaped IR heaters. Illustrated in FIG. 12 is partial-section perspective view of the pipe members 710, 712, coupler 714 and annular IR heaters 716 and 718. In another example embodiment, the IR heaters are coupled to a regulator 720 to vary the power to allow for penetration between the pipe members and coupler to form a welded seal bond therebetween. In one example embodiment, the regulator 720 is a voltage regulator that increases the IR wavelength to achieve greater heat penetration between the pipe members 710, 712, and the coupler 714.

Once the IR heating operation is complete, a clamp then presses the softer coupler 714 into the pipe members 710 and 712. In one example embodiment, the clamp and IR heaters 716 and 718 are constructed from the same device as shown in FIG. 12. In another example embodiment, a separate arcuate clamp surrounding the outer-most diameter of the coupler 714 and pipe members 710 and 712 (either automatically or manually) compresses the coupler into the pipe members subsequent the IR heating operation.

The welding system 700 is used to form the sealing connection 705 at a plant where piping is manufactured such as an OEM. Alternatively, the welding system 700 is used in the field where piping is installed or for repairs.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A method for welding ends of two separate articles or a single article to form a single welded article comprising the steps of:
spacing first and second ends of one or two articles to a prescribed distance;
advancing an infrared heater within said spacing between said first and second ends;
energizing said infrared heater for a prescribed period of time;
altering the power supplied for energizing the infrared heater over at least a portion of said prescribed period of time to achieve increased electromagnetic radiation penetration into the body of said one or more articles beyond said first and second ends; and
contacting said first and second ends together to form a single welded article;
wherein the step of altering the power supplied to the infrared heater further comprises the step of increasing the wavelength of said electromagnetic radiation during at least a portion of said prescribed period of time.

2. The method for welding ends of two separate articles or a single article to form a single welded article of claim 1 wherein the step of altering the power supplied to the infrared heater further comprises the step of decreasing the power supplied to said infrared heater.

3. A method for welding ends of two separate articles or a single article to form a single welded article comprising the steps of:
spacing first and second ends of one or two articles to a prescribed distance;
advancing an infrared heater within said spacing between said first and second ends;
energizing said infrared heater for a prescribed period of time;
altering the power supplied for energizing the infrared heater over at least a portion of said prescribed period of time to achieve increased electromagnetic radiation penetration into the body of said one or more articles beyond said first and second end; and
contacting said first and second ends together to form a single welded article;
wherein the step of altering the power supplied to the infrared heater further comprises the step of decreasing the frequency of said electromagnetic radiation.

4. The method for welding ends of two separate articles or a single article to form a single welded article of claim 1 wherein the step of energizing said infrared heater for said prescribed period of time further comprises projecting electromagnetic radiation having a wavelength between 1 and 5 micrometers at said first and second ends.

5. The method for welding ends of two separate articles or a single article to form a single welded article of claim 1 wherein the step of altering the power supplied for energizing the infrared heater over said prescribed period of time to achieve increased electromagnetic radiation penetration into the body of said one or more articles beyond said first and second ends to form a single welded article further comprises altering the power and/or prescribed period of time based measured parameters near said first and second ends.

6. The method for welding ends of two separate articles or a single article to form a single welded article of claim 5 wherein said step of measuring parameters comprises employing at least one pyrometer for detecting the temperature of said first or second ends.

7. A method for welding ends of two separate articles or a single article to form a single welded article comprising the steps of:
- spacing first and second ends of one or two articles to a prescribed distance;
- advancing an infrared heater within said spacing between said first and second ends;
- energizing said infrared heater for a prescribed period of time;
- altering the power supplied for energizing the infrared heater over at least a portion of said prescribed period of time to achieve increased electromagnetic radiation penetration into the body of said one or more articles beyond said first and second ends;
- contacting said first and second ends together to form a single welded article; and
- monitoring a surface temperature of at least one of said ends, the wavelength of the electromagnetic radiation being adjusted in response to the monitored surface temperature.

8. A method for welding ends of two separate articles or a single article to form a single welded article comprising the steps of:
- spacing first and second ends of one or two articles to a prescribed distance;
- advancing an infrared heater within said spacing between said first and second ends;
- energizing said infrared heater for a prescribed period of time;
- altering the power supplied for energizing the infrared heater over at least a portion of said prescribed period of time to achieve increased electromagnetic radiation penetration into the body of said one or more articles beyond said first and second ends;
- contacting said first and second ends together to form a single welded article; and
- rotating one of said ends to place the infrared heater in a parallel relationship with the other of said ends.

9. A method for welding ends of two separate articles or a single article to form a single welded article comprising the steps of:
- spacing first and second ends of one or two articles to a prescribed distance;
- advancing an infrared heater within said spacing between said first and second ends;
- energizing said infrared heater for a prescribed period of time;
- altering the power supplied for energizing the infrared heater over at least a portion of said prescribed period of time to achieve increased electromagnetic radiation penetration into the body of said one or more articles beyond said first and second ends;
- contacting said first and second ends together to form a single welded article; and
- concomitant rotation of one of said ends while translating the other of said ends in order to place said infrared heater in parallel relationship with the said ends.

10. An apparatus for welding ends of two separate articles or a single article to form a single welded article comprising:
- first and second molds for supporting and clamping first and second ends of at least one article;
- an infrared heating element for thermally energizing over a prescribed period of time said first and second ends of said at least one article to a welding condition;
- a regulator for altering the power supplied for energizing the infrared heater over at least a portion of said prescribed period of time to achieve increased electromagnetic radiation penetration into the body of said at least one article beyond said first and second ends; and
- an actuator for advancing said first and second ends into a contacting position to form a single welded article;
- wherein said regulator decreases the power supplied for energizing the infrared heater over at least a portion of said prescribed period of time thereby increasing the wavelength of the electromagnetic radiation penetration emitted into the body of said at least one article beyond said first and second ends.

11. The apparatus for welding ends of two separate articles or a single article to form a single welded article of claim 10 whereby fleshless welding occurs by clamping and plunging at least one the ends into one of said first and second molds until contact is made against the other end within said mold.

12. An apparatus for welding ends of two separate articles or a single article to form a single welded article comprising:
- first and second molds for supporting and clamping first and second ends of at least one article;
- an infrared heating element for thermally energizing over a prescribed period of time said first and second ends of said at least one article to a welding condition;
- a regulator for altering the power supplied for energizing the infrared heater over at least a portion of said prescribed period of time to achieve increased electromagnetic radiation penetration into the body of said at least one article beyond said first and second ends;
- an actuator for advancing said first and second ends into a contacting position to form a single welded article; and
- a rotational actuator coupled to said first mold and a catwalk translator coupled to said second mold such that concomitant rotation of said first mold supporting said first end with a translating of the second mold supporting said second end in order to position said infrared heater in parallel relationship with the extrusion ends.

13. The apparatus for welding ends of two separate articles or a single article to form a single welded article of claim 10 further comprising a microprocessor for altering the power supplied for energizing the infrared heater over said prescribed period of time to achieve increased electromagnetic radiation penetration into the body of said at least one article beyond said first and second ends to form a single welded article.

14. The apparatus for welding ends of two separate articles or a single article to form a single welded article of claim 10 further comprising a one or more sensors for monitoring a surface temperature of at least one of the first and second ends, the power being supplied to said infrared heater being adjusted in response to the monitored surface temperature.

15. The apparatus for welding ends of two separate articles or a single article to form a single welded article of claim 10 further comprising a timer for altering the power supplied to said infrared heater over at least a portion of said prescribed period of time.

* * * * *